(12) United States Patent
Venugopal

(10) Patent No.: US 11,457,270 B1
(45) Date of Patent: Sep. 27, 2022

(54) CONTENT PROCESSING WORKFLOW THAT ALTERS OBJECTIONABLE CONTENT SEGMENTS TO ENHANCE CUSTOMER VIEWING EXPERIENCE

(71) Applicant: AT&T Intellectual Property I, L.P., Atlanta, GA (US)

(72) Inventor: Megha Venugopal, Torrance, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/325,391

(22) Filed: May 20, 2021

(51) Int. Cl.
| | |
|---|---|
| H04N 21/44 | (2011.01) |
| G06K 9/62 | (2022.01) |
| H04N 21/81 | (2011.01) |
| H04N 21/45 | (2011.01) |
| H04N 21/475 | (2011.01) |
| G06V 20/40 | (2022.01) |

(52) U.S. Cl.
CPC ....... *H04N 21/44016* (2013.01); *G06K 9/628* (2013.01); *G06K 9/6217* (2013.01); *G06V 20/41* (2022.01); *H04N 21/4532* (2013.01); *H04N 21/4755* (2013.01); *H04N 21/812* (2013.01)

(58) Field of Classification Search
CPC ......... H04N 21/44016; H04N 21/4755; H04N 21/4532; H04N 21/812; G06K 9/6217; G06K 9/628; G06V 20/41
See application file for complete search history.

(56) References Cited

U.S. PATENT DOCUMENTS

| | | | |
|---|---|---|---|
| 8,079,044 B1 * | 12/2011 | Craner | H04N 21/4826 725/28 |
| 10,088,983 B1 * | 10/2018 | Qaddoura | H04N 21/23439 |
| 10,270,983 B1 * | 4/2019 | Van Os | G06F 3/017 |
| 10,542,314 B2 * | 1/2020 | Dominguez | H04N 21/44218 |
| 10,741,213 B1 * | 8/2020 | Selby | G11B 27/031 |
| 11,055,900 B1 * | 7/2021 | Thurston, III | H04N 13/282 |
| 2004/0194127 A1 * | 9/2004 | Patton | H04N 21/44012 725/135 |
| 2006/0130119 A1 * | 6/2006 | Candelore | H04N 21/8541 725/135 |

(Continued)

*Primary Examiner* — Jefferey F Harold
*Assistant Examiner* — Timothy R Newlin
(74) *Attorney, Agent, or Firm* — Guntin & Gust, PLC; Ralph Trementozzi

(57) ABSTRACT

Aspects of the subject disclosure may include, for example, obtaining media content, providing it as input to a neural network adapted to categorize scenes according to predetermined categories, and generating metadata according to the categorization. An objectionable scene is identified based on a user preference and according to a characterization. An altered scene based on a content of the objectionable scene may be obtained responsive to the identifying of the objectionable scene. The altered scene provides a suitable scene in place of the objectional scene that preserves information of the content to obtain preserved information. Replacement of the objectionable scene with the altered scene may be facilitated to obtain adapted media content, wherein presentation of the adapted media content via equipment avoids presentation of the objectionable scene, while maintaining a continuity of the original media content via the preserved information. Other embodiments are disclosed.

20 Claims, 13 Drawing Sheets

(56) References Cited

U.S. PATENT DOCUMENTS

| | | | |
|---|---|---|---|
| 2006/0130121 A1* | 6/2006 | Candelore | H04N 21/8541 725/115 |
| 2009/0320059 A1* | 12/2009 | Bolyukh | G06Q 30/0255 725/32 |
| 2010/0153993 A1* | 6/2010 | Konig | G06Q 30/02 725/34 |
| 2011/0093882 A1* | 4/2011 | Candelore | H04N 21/84 725/28 |
| 2012/0042247 A1* | 2/2012 | Harper | H04N 21/4542 709/225 |
| 2012/0272185 A1* | 10/2012 | Dodson | H04N 21/4828 715/810 |
| 2013/0051764 A1* | 2/2013 | Casagrande | H04N 21/8113 386/E5.009 |
| 2013/0188862 A1* | 7/2013 | Lievens | G06T 19/20 382/154 |
| 2013/0283162 A1* | 10/2013 | Aronsson | G11B 27/105 715/719 |
| 2015/0006752 A1* | 1/2015 | O'Hare | H04L 65/4069 709/231 |
| 2016/0309214 A1* | 10/2016 | Chung | H04N 21/43076 |
| 2016/0373814 A1* | 12/2016 | Kellner | G06V 20/40 |
| 2017/0046746 A1 | 2/2017 | Kumar et al. | |
| 2017/0272818 A1* | 9/2017 | Gattis | H04N 21/44008 |
| 2018/0192158 A1* | 7/2018 | Smith | H04N 21/251 |
| 2018/0205999 A1* | 7/2018 | Garrett | G06T 19/006 |
| 2018/0276296 A1 | 9/2018 | Gerlach | |
| 2019/0052928 A1 | 2/2019 | Zabetian | |
| 2019/0102420 A1 | 4/2019 | O'Malley et al. | |
| 2019/0174189 A1* | 6/2019 | Zhang | G11B 27/34 |
| 2019/0313135 A1* | 10/2019 | Pathak | H04N 21/8586 |
| 2020/0092610 A1* | 3/2020 | Baughman | H04N 21/42201 |
| 2020/0228880 A1* | 7/2020 | Iyer | H04N 21/23424 |
| 2021/0065748 A1* | 3/2021 | Chu | H04N 21/44008 |

* cited by examiner

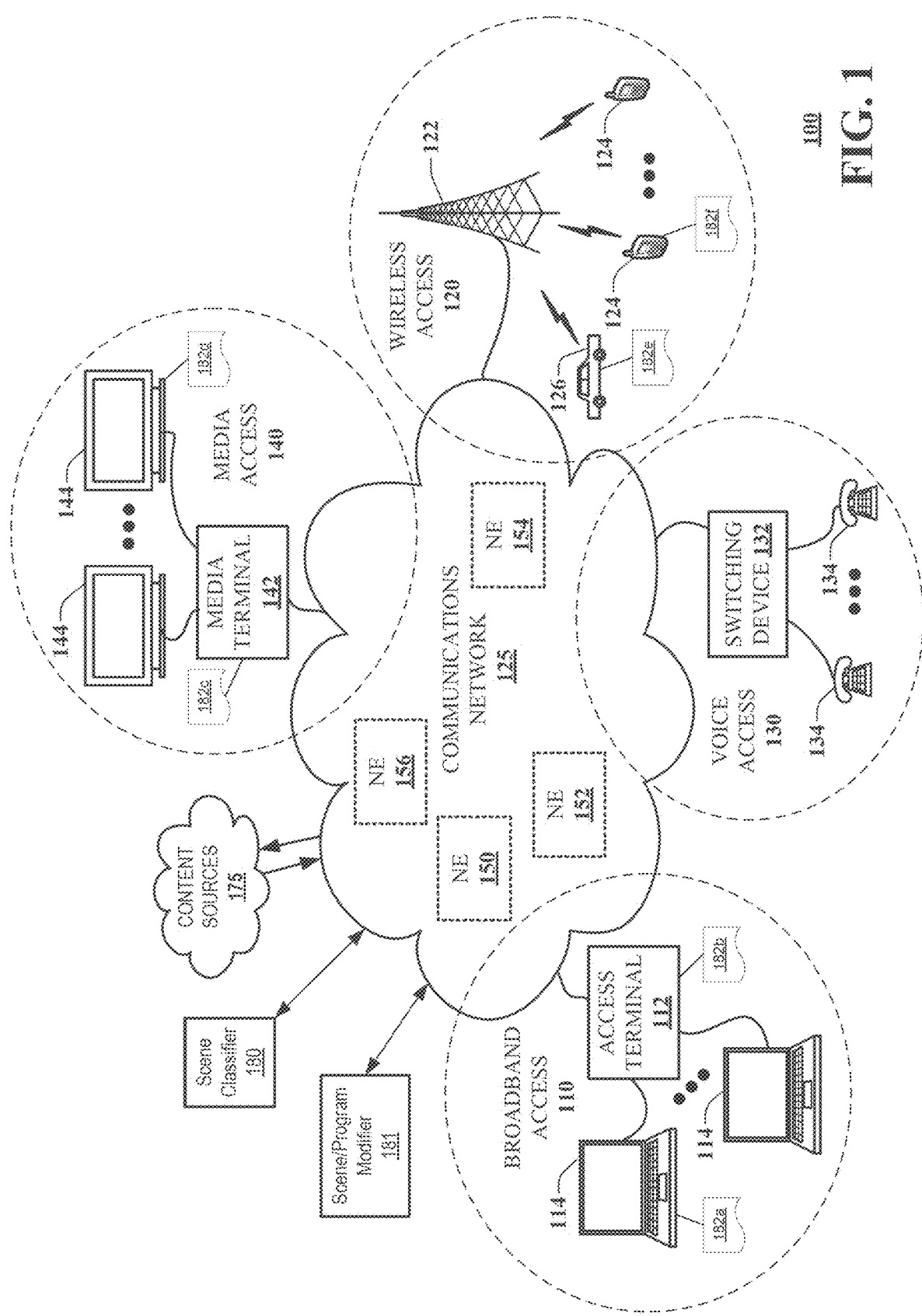

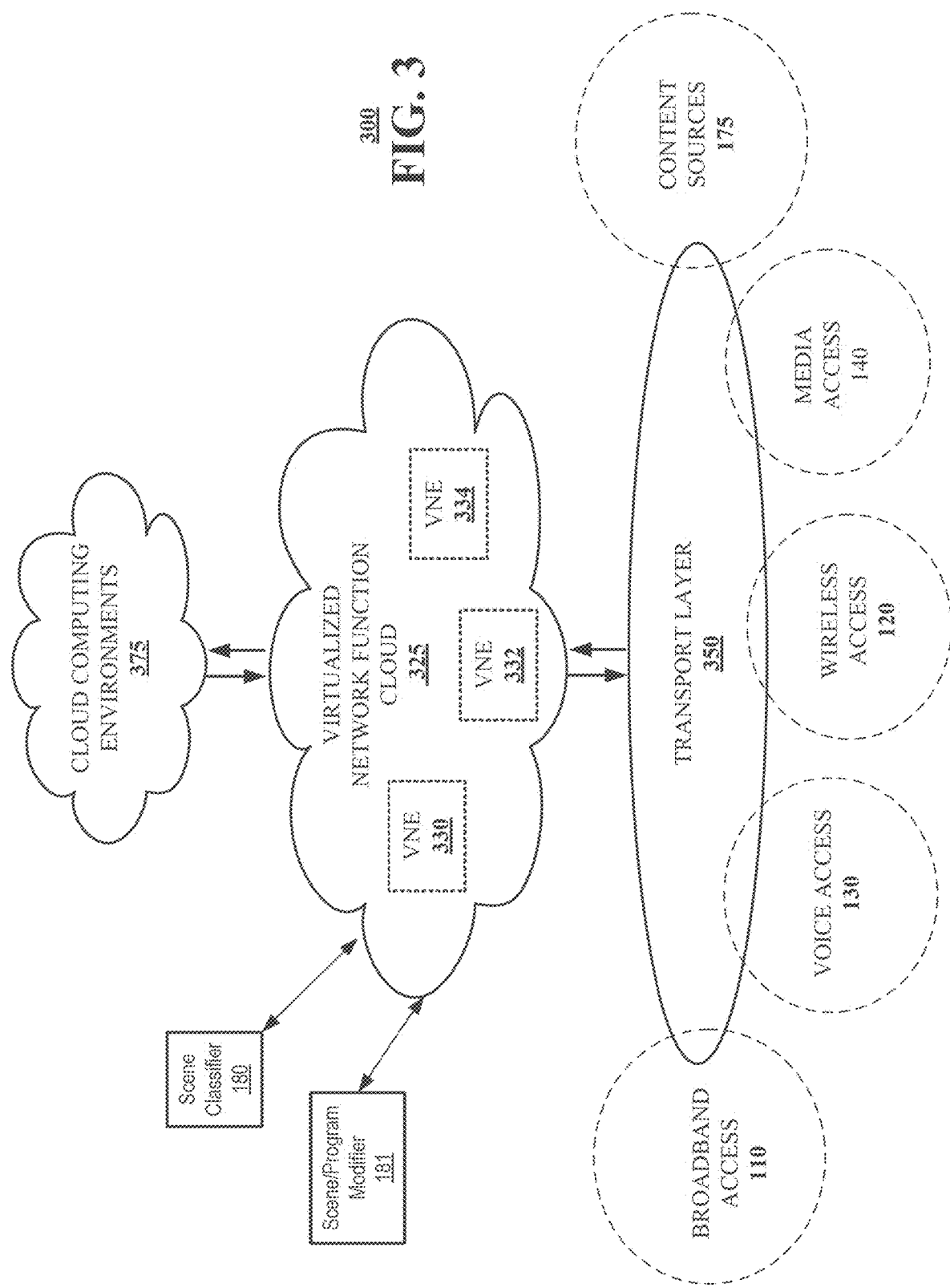

CONTENT PROCESSING WORKFLOW THAT ALTERS OBJECTIONABLE CONTENT SEGMENTS TO ENHANCE CUSTOMER VIEWING EXPERIENCE

FIELD OF THE DISCLOSURE

The subject disclosure relates to a content processing workflow that alters objectionable content segments to enhance customer viewing experience.

BACKGROUND

A viewing experience in viewing broadcast television programs over cable television systems may include viewing media content on a particular channel. Alternatively, users of a streaming media content platform may stream media content to a user's television via a media processor or mobile device. The media content may be viewed by family members in the home including parents and children. Further, the media content may include a scene unsuitable for the children. Consequently, as the scene is presented on the television, a parent may switch viewing the current media content to another media content or fast forward the unsuitable scene entirely. However, in such situations, the user viewing experience may be diminished or otherwise negatively impacted.

BRIEF DESCRIPTION OF THE DRAWINGS

Reference will now be made to the accompanying drawings, which are not necessarily drawn to scale, and wherein:

FIG. 1 is a block diagram illustrating an exemplary, non-limiting embodiment of a communications network in accordance with various aspects described herein.

FIG. 3 is a block diagram illustrating an example, non-limiting embodiment of a virtualized communication network in accordance with various aspects described herein.

DETAILED DESCRIPTION

Figure 2A:
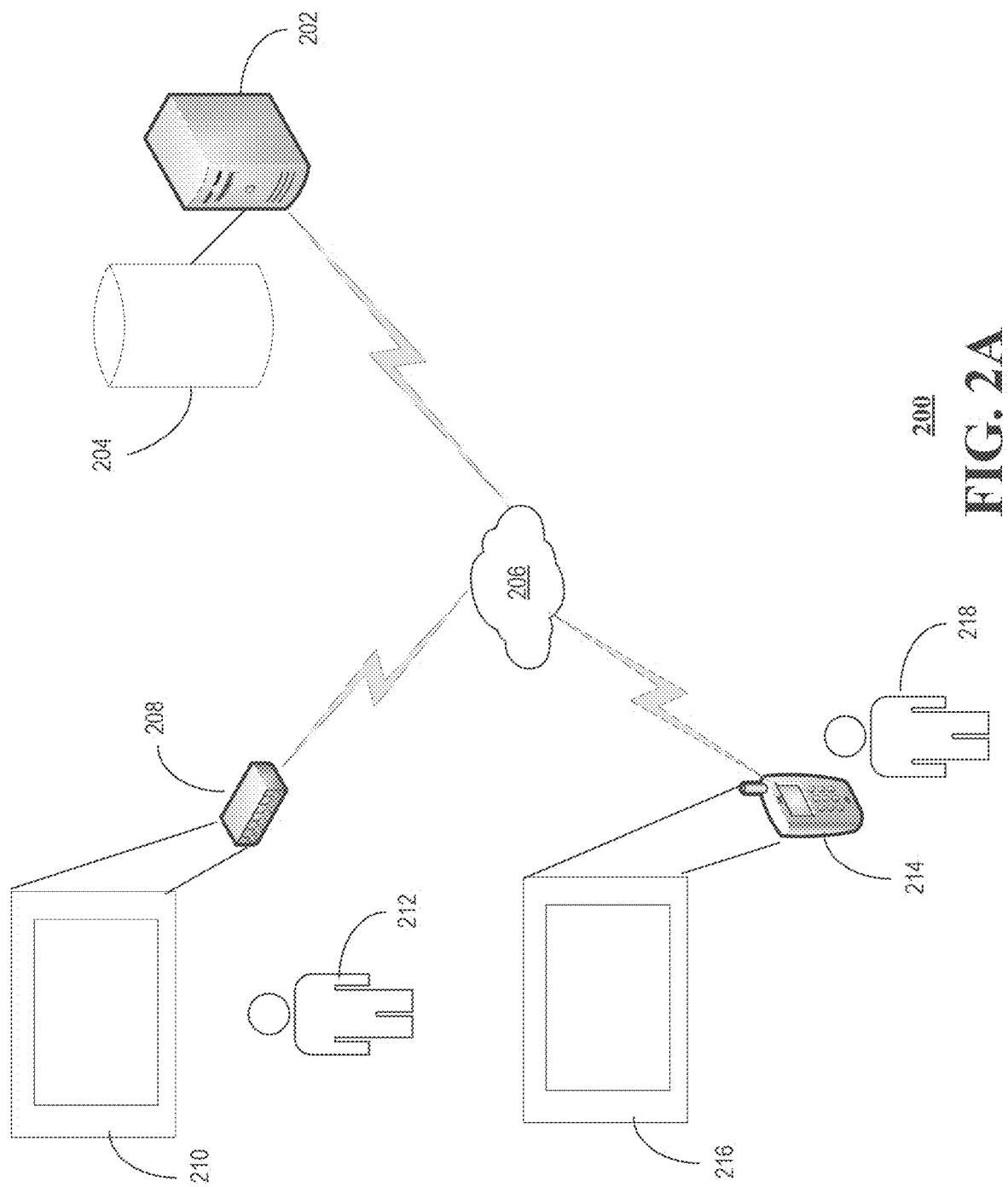
FIGS. 2A-2B are block diagrams illustrating aspects of an example, non-limiting embodiment of a system functioning within the communication network of FIG. 1 in accordance with various aspects described herein.

The subject disclosure describes, among other things, illustrative embodiments for obtaining, over a first communication network, media content from a media content repository. The media content may include a sequence of content segments, e.g., scenes of a video program. Further, the embodiments may include analyzing each of the segments of the media content utilizing one or more media recognition techniques, such as image recognition, based on a segment criteria resulting in an analysis, identifying a first content segment of the group of content segments based on the analysis, and generating metadata associated with the first segment according to the segment criteria. The media content may be altered by replacing one or more content segments with altered content segments according to the segment criteria. Altered segments may be generated for insertion into the altered media content in place of any objectionable content segments identified according to the content criteria, such that replaced content segments facilitate program continuity by replacing objectionable segments with apt segments according to the content criteria.

Additional embodiments may include providing, over a second communication network, the media content, and the metadata to a media processor. Also, the media processor detects the metadata, adjusts the media content according to the metadata resulting in an adjusted media content, and presents the adjusted media content on a display communicatively coupled to the media processor. Other embodiments are described in the subject disclosure.

One or more aspects of the subject disclosure include a device, comprising a processing system including a processor, and a memory that stores executable instructions that, when executed by the processing system, facilitate performance of operations. The operations may include obtaining original media content having a number of scenes, providing the scenes as input to a neural network adapted to categorize the scenes according to predetermined categories to obtain a scene-by-scene categorization, and generating metadata according to the scene-by-scene categorization, wherein the metadata comprises a characterization of each scene of the original media content according to the predetermined categories, wherein the metadata includes a characterization of each scene of the number of scenes of the original media content according to a number of predetermined categories. A preference of a user may be received that identifies an objectionable category of the number of predetermined categories, and a first objectionable scene of the number of scenes may be identified based on the preference of the user and according to a first characterization of the first objectionable scene of the number of scenes. A first altered scene may be generated responsive to the identifying of the first objectionable scene and based on a first content of the first objectionable scene. The first altered scene may provide a first suitable scene in place of the first objectional scene, wherein the first suitable scene preserves information of the first content to obtain preserved information. The first objectionable scene may be replaced with the first altered scene to obtain adapted media content, wherein presentation of the adapted media content via equipment of the user may avoid presentation of the first objectionable scene, while maintaining a continuity of the original media content via the preserved information.

One or more aspects of the subject disclosure include a process. The process may include obtaining, by a processing system including a processor, original media content including a number of scenes, providing the scenes as input to a neural network adapted to categorize the scenes according to predetermined categories to obtain a scene-by-scene categorization, and generating metadata according to the scene-by-scene categorization. The metadata may include a characterization of each scene of the number of scenes of the original media content according to a number of predetermined categories. A preference of a user may be identified, by the processing system, that further identifies an objectionable category of the number of predetermined categories. A first objectionable scene of the number of scenes may be identified by the processing system based on the preference of the user and according to a first characterization of the first objectionable scene of the number of scenes. A first altered scene based on a first content of the first objectionable scene may be obtained by the processing system, responsive to the identifying of the first objectionable scene. The first altered scene may provide a first suitable scene in place of the first objectional scene, wherein the first suitable scene preserves information of the first content to obtain preserved information. The first objectionable scene may be replaced, by the processing system, with the first altered scene to obtain adapted media content, wherein presentation of the adapted media content via equipment of the user avoids presentation of the first objectionable scene, while maintaining a continuity of the original media content via the preserved information.

One or more aspects of the subject disclosure include a non-transitory, machine-readable medium, comprising executable instructions that, when executed by a processing system including a processor, facilitate performance of operations. The operations may include obtaining original media content including a number of scenes, providing the scenes as input to a neural network adapted to categorize the scenes according to predetermined categories to obtain a scene-by-scene categorization, and generating metadata according to the scene-by-scene categorization. The metadata includes a characterization of each scene of the plurality of scenes of the original media content according to a number of predetermined categories. A user preference may be identified that further identifies an objectionable category of the number of predetermined categories. A first objectionable scene of the plurality of scenes may be identified based on the user preference and according to a first characterization of the first objectionable scene of the number of scenes. A first altered scene based on a first content of the first objectionable scene may be obtained responsive to the identifying of the first objectionable scene, wherein the first altered scene provides a first suitable scene in place of the first objectional scene. The first suitable scene may preserve information of the first content to obtain preserved information. Replacement of the first objectionable scene with the first altered scene may be facilitated to obtain adapted media content, wherein presentation of the adapted media content via equipment avoids presentation of the first objectionable scene, while maintaining a continuity of the original media content via the preserved information.

One or more aspects of the subject disclosure include a device, comprising a processing system including a processor, and a memory that stores executable instructions that, when executed by the processing system, facilitate performance of operations. The operations may include obtaining, over a first communication network, media content from a media content repository. The media content includes a group of scenes. Further operations may include analyzing each of the group of scenes of the media content utilizing an image recognition technique based on a scene criteria resulting in an analysis, identifying a first scene of the group of scenes based on the analysis, and generating metadata associated with the first scene according to the scene criteria. Additional operations may include providing, over a second communication network, the media content, and the metadata to a media processor. Also, the media processor detects the metadata, adjusts the media content according to the metadata resulting in an adjusted media content, and presents the adjusted media content on a display communicatively coupled to the media processor.

One or more aspects of the subject disclosure include a non-transitory, machine-readable medium, comprising executable instructions that, when executed by a media processor including a processor, facilitate performance of operations. The operations may include receiving, over a communication network, media content and metadata associated with the media content from a video content management server. The video content management server obtains the media content from a media content repository. Further, the media content includes a group of scenes. In addition, the video content management server analyzes each of the group of scenes of the media content utilizing an image recognition technique implemented by a machine learning application based on a scene criteria resulting in analysis, the video content management server identifies a first scene of the group of scenes based on the analysis, and the video content management server generates the metadata associated with the first scene according to the scene criteria. Further operations may include detecting the metadata associated with the media content and adjusting the media content according to the metadata resulting in an adjusted media content. Additional operations may include presenting the adjusted media content on a display communicatively coupled to the media processor.

One or more aspects of the subject disclosure include a process. The process may include receiving, by a media processor including a processor, over a communication network, media content and metadata associated with the media content from a video content management server. The video content management server obtains the media content from a media content repository. Further, the media content includes a group of scenes. In addition, the video content management server analyzes each of the group of scenes of the media content utilizing an image recognition technique implemented by a machine learning application based on a scene criteria resulting in analysis, the video content management server identifies a first scene of the group of scenes based on the analysis, and the video content management server generates the metadata associated with the first scene according to the scene criteria. Further, the process may include detecting, by the media processor, the metadata associated with the media content, and adjusting, by the media processor, the media content according to the metadata resulting in an adjusted media content. Also, the process may include presenting, by the media processor, the adjusted media content on a display communicatively coupled to the media processor, and providing, by the media processor, over the communication network, the first scene to a digital video recorder.

Referring now to FIG. 1, a block diagram is shown illustrating an example, non-limiting embodiment of a system 100 in accordance with various aspects described herein. For example, the system 100 may facilitate in whole or in part improving a user's experience by utilizing machine learning to detect and adjust unsuitable scenes for a user when viewing media content. For example, an unsuitable segment of a program may be detected from metadata of the program that has been generated responsive to an application of a neural network trained to identify unsuitable content. Adjustment of the program segment may take one or more of a variety of forms adapted to overcome the unsuitability, while preserving continuity of the program, e.g., replacing the unsuitable segment or scene with an overlay and/or a replacement segment in which an avatar provides suitable dialogue and/or action to replace the unsuitable scene. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to the one or more content sources 175 of audio, video, graphics, text and/or other media. While broadband access 110, wireless access 120, voice access 130 and media access 140 are shown separately, one or more of these forms of access may be combined to provide multiple access services to a single client device (e.g., mobile devices 124 may receive media content via media terminal 142, data terminal 114 may be provided voice access via switching device 132, and so on).

The communications network 125 includes a plurality of network elements (NE) 150, 152, 154, 156, etc., for facilitating the broadband access 110, wireless access 120, voice access 130, media access 140 and/or the distribution of content from the one or more content sources 175. The communications network 125 may include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 may include a digital subscriber line access multiplexer (DSLAM), cable modem termination system (CMTS), optical line terminal (OLT) and/or other access terminal. The data terminals 114 may include personal computers, laptop computers, netbook computers, tablets, or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 may include a 4G, 5G, or higher generation base station, an access point that operates via an 802.11 standard such as 802.11n, 802.11ac or other wireless access terminal. The mobile devices 124 may include mobile phones, e-readers, tablets, phablets, wireless modems, and/or other mobile computing devices.

In various embodiments, the switching device 132 may include a private branch exchange or central office switch, a media services gateway, VoIP gateway or other gateway device and/or other switching device. The telephony devices 134 may include traditional telephones (with or without a terminal adapter), VoIP telephones and/or other telephony devices.

In various embodiments, the media terminal 142 may include a cable head-end or other TV head-end, a satellite receiver, gateway, or other media terminal 142. The display devices 144 may include televisions with or without a set top box, personal computers and/or other display devices.

In various embodiments, the one or more content sources 175 may include broadcast television and radio sources, video on demand platforms and streaming video and audio services platforms, one or more content data networks, data servers, web servers and other content servers, and/or other sources of media.

In various embodiments, the communications network 125 may include wired, optical and/or wireless links and the network elements 150, 152, 154, 156, etc., may include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

The example system 100 includes a scene classifier, e.g., a scene classification server 180 and a scene and/or program modifier, e.g., a scene adaptation server 181. The scene classification server 180 may be adapted to process one or more media content items, e.g., programs, movies, shows, serials, to identify any unsuitable segments and/or scenes that may be included therein. Unsuitability may determined according to one or more categories. Such objectionable categories may include, without limitation, categories based on visual content, e.g., that may depict one or more of images, action, thematic content, and the like. Alternatively or in addition, examples of objectionable categories may include audio content, such as strong language, mature dialogue, cursing, loud noises, such as explosions, screams, and so on. At least some objectionable categories may be based upon a combination of more than one of the visual and/or audio categories. For example, nudity together mature thematic content and/or dialogue may be objectionable, whereas nudity in a medical and/or artistic context may not be.

In at least some embodiments, the scene classification server 180 may be adapted to identify one or more objectionable segments or scenes automatically, e.g., with little or no manual intervention. For example, the classification server 180 may apply machine learning to train the scene classification server 180 to recognize one or more predetermined categories, such as the aforementioned examples of objectionable categories. In at least some embodiments, the scene classification server 180 may include one or more neural networks, such as a convolutional neural network. The neural networks may be trained according to a training set that may include examples of media content presenting one or more of the predetermined objectionable categories and/or other non-objectionable material.

The scene classification server 180 may be communicatively coupled to one or more elements of the example system 100, e.g., via the communications network 125 and one or more of the broadband access 110, the wireless access 120, the voice access 130 and the media access 140. In at least some embodiments, the scene classification server 180 may be communicatively coupled to one or more of the scene adaptation server 180 and the one or more content sources 175. For example, the scene classification server 180 may obtain a media content item from the one or more content sources 175. The media content item may include metadata and a sequence of segments and/or scenes. The metadata and/or sequence of scenes may be unclassified according to the objectionable categories, in which instances, the scene classification server 180 may process one or more segments, scenes and/or the entire media content item to categorize the segments or scenes according to predetermined objectionable categories. It is envisioned that in at least some embodiments, one or more of the scene classification server 180, the scene adaptation server 181 and/or the one or more content sources 175 may be collocated, e.g., in local communication, and/or integrated within a common system or server.

In at least some embodiments, the scene classification server 180 may generate a record of the classification of a particular segment, scene and/or program. The classification record may be prepared as a separate item, such as a classification file. The classification file may identify a segment and/or scene according to one or more of a time reference, e.g., a start and/or end time of one or more segments measured from a reference time, such as program start, a commercial break, and the like. Alternatively or in addition, the classification file may identify a segment and/or scene according to a frame reference, e.g., a frame number of a sequence of frames of the media content item. The classification record may be retained and/or returned to the one or more content sources 175 and/or another repository, such that the record may be accessed at a later time to identify program segments that may include objectionable material.

In at least some embodiments, the classification record may be integrated with the media content item, e.g., as an adapted media content item. For example, the classification record may be incorporated into metadata of an adapted program. The metadata may include information that identifies the media content item as an adapted media content item that has been processed, e.g., by the scene classification server 180, to identify segments or scenes that may include objectionable subject matter. In at least some embodiments, the metadata may identify one or more of a date and/or time at which the program was classified, a version of scene classifier that may have been used for the classification, a listing of categories against which the program was classified, and so on. In at least some embodiments, the metadata of a particular segment and/or scene may be generated to identify the scene as containing objectionable content. For example, scene-by-scene metadata may identify for each scene one or more objectionable categories within the corresponding scene.

Alternatively or in addition, the metadata may identify information that provides an overview and/or summary of the classification. For example, such summary information may include one or more of a number or tally of scenes containing any objectionable material and/or a number of scenes containing one or more particular objectionable categories. A classification overview may include a percentage of segments and/or scenes of the total segments and/or scenes of a program that contain any objectionable material and/or one or more particular objectionable categories. In at least some embodiments, the classification overview may include a duration, e.g., a time and/or fraction or percentage of a program that include any objectionable material and/or one or more particular objectionable categories.

It is envisioned that such classification overview may be presented in a program listing, e.g., in an electronic program guide, to provide potential viewers with quick access to assess whether segment and/or scene adaptation and/or replacement should be applied to a particular program. For example, if a program has a limited number of objectionable scenes, the adaptation techniques disclosed herein would allow a user to enjoy the program without being subjected to any unsuitable content, while preserving a continuity of the program. However, if the number of objectionable scenes is excessive, e.g., above some number, duration, fraction and/or percentage of the program, a user may choose not to apply to adaptation techniques as an excessive number may detract from the overall program. For example, a parent may choose not to view such a program in the presence of children, instead viewing it without and/or perhaps with a more limited set of objectionable categories, after the children have gone to bed.

The scene adaptation server 181 may be communicatively coupled to one or more elements of the example system 100, e.g., via the communications network 125 and one or more of the broadband access 110, the wireless access 120, the voice access 130 and the media access 140. In at least some embodiments, the scene adaptation server 181 may be communicatively coupled to one or more of the scene classification server 180 and/the one or more content sources 175. The scene adaptation server 181 may identify and/or is otherwise be presented with a media content item for adaptation processing. For example, the scene adaptation server 181 may identify a media content item responsive to a user selection of the media content item, e.g., via an electronic program guide, and/or an on-demand media application. Alternatively or in addition, the adaptation server 181 may identify a media content item according to a background process in which a group of media content items may be modified in a batch mode in anticipation of a future user selection. In at least some embodiments, a user may identify one or more programs to be presented at a later date, allowing the scene adaptation server 181 to adapt the selected programs in a batch mode. In at least some embodiments, the scene adaptation server 181 may adapt media content in real time and/or near real time, e.g., "on the fly" responsive to a user selection to presently consume the media content item.

The scene adaptation server 181 accesses an identified media content item and a classification record. For example, the scene adaptation server 181 may obtain an adapted media content item from the one or more content sources 175, the adapted media content item having metadata that includes classification results, e.g., identifying objectionable categories within one or more segments or scenes. The scene adaptation server 181 identifies objectionable segments and/or scenes from the classification record and prepares one or more adapted segments and/or scenes applying an adaptation process that removes the objectionable content and replaces it with suitable content adapted to preserve a continuity of the segment, the scene and/or the overall program.

Adaptations may include, without limitation, modification of a scene by changing one or more of a resolution, a color, a brightness of the scene, e.g., to obscure objectionable visual content. Alternatively or in addition, the adaptation may include an overlay configured to overlay all or a portion of video frames of the objectionable segment with suitable overlay content. Suitable overlay content may include simple blocking content, such as a geometric shape, e.g., a rectangle and/or ellipse. Alternatively or in addition, suitable overly may simulate a screen, e.g., blocking finer detail of the visual content, e.g., avoiding details of a nude scene or sexual content, while permitting a viewer to observe a silhouette as may be observable through the screen.

In at least some embodiments, adaptations may include replacement of a segment and/or scene with replacement content. For example, replacement content may be generated by a content producer in anticipation of objectionable scenes. Consider a violent or graphic scene of an assault or murder that may be objectionable to some viewers. The producer may provide a replacement segment and/or scene of the same action filmed and/or otherwise presented from another angle that avoids at least some of the graphic nature of the original scene. Such filming may be obtained from a different angle, and/or from a greater distance. It is envisioned that the replacement content may be prepared together with the original media content and/or at a later time. Such later production may be obtained using the same actors and scenes. Alternatively or in addition, such later productions may be obtained using different actors and/or different scenes but presented in a manner that preserves a story line of the segment, the scene and/or the overall media content item.

Some adaptations may include an avatar and/or a computer-generated image such as an animated character. The avatar and/or animated character may be adapted to act in accordance with an objectionable scene, e.g., performing some action that corresponds to the objectionable content, without itself being objectionable. For example, a scene in which an actor is engaging in a first activity in conjunction with as second activity that may include an objectionable action, may be replaced with an avatar engaging in the first activity without engaging in the second. Consider actors of a scene engaging in importation dialogue in conjunction with the acts of smoking, alcohol consumption or illicit drug use. The scene adaptation server having identified the scene as objectionable, and having determined a particular objectionable activity, e.g., from the metadata, may prepare a substitute or replacement scene in which one or more avatars perform the action that includes the first activity, e.g., the dialogue, without performing the objectionable activity. In at least some embodiments, the original soundtrack of the media content may be used in the replacement scene, e.g., including the original dialogue.

In at least some embodiments, the example system 100 includes one or more application programs adapted to coordinate with one or more of the scene classification server 180 and/or the scene adaptation server 181. For example, one or more of the data terminal 114 and/or the access terminal 112 of the broadband access 110 may include an application program 182*a*, 182*b*. Likewise, one or more of the display device 144 and/or the media terminal 142 of the media access 140 may include an application program 182*b*, 182*c* and/or one or more of the mobile devices 124 and/or vehicles 126 may include application programs 182*d*, 182*e*. The application programs 182*a*, 182*b*, 182*c*, 182*d*, 182*e*, 182*f*, generally 182, may provide some or all of the scene classification and/or scene adaptation functionality disclosed herein. For example, the application programs 182 may be standalone programs adapted to perform one or more of the classification and/or adaptation functions disclosed herein.

Alternatively or in addition, one or more of the application programs 182 may be adapted to function in coordination with one or more backend services, e.g., provided by one or more of the scene classification server 180 and/or the scene adaptation server 181. For example, the application 182 may present a listing of categories on a user interface and accept a user input that identifies one or more of the categories as objectionable and/or suitable. The selections may be retained in a user profile and/or provided to one or more of the classification server and/or the scene adaptation server 181. For example, a user input identifying objectionable categories may be provided to the classification server to classify a media program responsive to the user input. A classified version of the media program may be presented to the scene adaptation server 181, e.g., responsive to the classification, permitting the scene adaptation server 181 to generate an adapted version, e.g., including adapted segments and/or scenes to replace the objectionable content. For example, a user input identifying objectionable categories may be provided to the classification server to classify a media program responsive to the user input.

Alternatively or in addition, a classified version of the media program may be prepared beforehand according to a predetermined list of categories. Responsive to a user selection, the pre-classified media program is presented to the scene adaptation server 181, permitting the scene adaptation server 181 to generate an adapted version, e.g., including adapted segments and/or scenes to replace the objectionable content according to the user selections. It is envisioned that in at least some embodiments, the classification and adaptation processes may be determined beforehand, e.g., according to the predetermined listing of categories, preparing adapted scenes for some or all possible objectionable categories. The adapted content may be stored and served on-demand responsive to a user selection, e.g., received via one or more of the application programs 182. Assembly of an adapted program may be prepared from pre-adapted segments and in coordination with user input identifying objectionable categories. Thus, an adapted program may be assembled by one or more of the scene adaptation server 181, the one or more content sources 175 and/or the application program 182 itself, by obtaining the original program, identifying objectionable scenes based on user selections, and replacing objectionable scenes with previously prepared adapted scenes. It is envisioned further that more than one adapted segments or scenes may be prepared for each segment of scene to accommodate different selections of objectionable content, including different objectionable categories and/or combinations of categories.

Figure 2B:

FIGS. 2A-2B are block diagrams illustrating aspects of an example, non-limiting embodiment of a system functioning within the communication network of FIG. 1 in accordance with various aspects described herein. Referring to FIG. 2A, in one or more embodiments, system 200 includes a video content management server 202 communicatively coupled to a media content repository 204. The media content repository 204 may be stored in the video content management server 202 itself or stored in a database communicatively coupled to the video content management server 202 over a communication network. Further, the video content management server 202 may be communicatively coupled to a media processor (e.g., set-top box) over communication network 206 and the video content management server 202 may be communicatively coupled to a mobile device 214 over communication network 206. In addition, the media processor may be communicatively coupled to a display 210 (e.g., television) that is viewed by user 212. Also, the mobile device may be communicatively coupled to a display 216 (e.g., television) that is viewed by user 218. Both the media processor 208 and the mobile device 214 may be communicatively coupled to their respective display 210, 216 via a wire or a communication network (e.g., wireless network, WiFi network, peer-to-peer wireless network, etc.).

In one or more embodiments, the communication network 206 as well as the communicatively coupling of the video content management server 202 to media content repository 204 as well as the media processor 208 communicatively coupled to display 210 and mobile device 214 communicatively coupled display 216 may be over one or more wireless communication networks, one or more wired communication networks, or a combination thereof. Further, the video content management server 202 may include one server or multiple servers in one location, multiple servers spanning multiple locations, a virtual server in one location, multiple virtual servers spanning multiple locations, or one or more cloud servers. The mobile device 214 may function as a media processor by casting or mirroring media content displayed on the mobile device 214 to display 216. In addition, some of all of the functions of the video content management server 202, described herein, may be integrated and/or performed by the media processor 208 or mobile device 214. Also, the mobile device 214 may include a mobile phone, tablet computer, laptop computer, dongle, smartwatch, wearable device, virtual reality device, augmented reality device, any other computing device, or a combination thereof. The video content management server 202 may be operated by a cable television service provider, satellite television service provider, video-on-demand provider, streaming media content provider, or any other media content provider.

In one or more embodiments, a user 212 or user 218 may desire to view media content on respective display 210, 216 with a child and would like the child not to view any scenes within the media content that may be unsuitable for children. Addressing this need, the video content management server 202 may obtain media content from a media content repository 204. The media content may include a group of scenes. Further, the video content management server 202 may analyze each of the group of scenes of the media content utilizing one or more image recognition techniques based on scene criteria by implementing a machine learning application resulting in an analysis of the media content. The scene criteria may include determining whether any scene within the media content includes profane language, graphic violence, and/or sex. In some embodiments, the scene criteria may have a default setting for each criterion within the scene criteria provided by a media content provider operating the video content management server 202. In other embodiments, the scene criteria may be provided, at least in part, by a user 212, 218 that provides specific profane words to detect or specific profane words to prohibit allow as well as specific descriptions of graphic violence and/or sex to prohibit or allow.

In one or more embodiments, the video content management server 202 may identify a scene of the group of scenes within the media content based on the analysis. Further, the video content management server 202 may generate metadata associated with the first scene according to the scene criteria. Referring to FIG. 2B, example metadata 219 is shown that may be generated and associated with the scene. The metadata may include the media content duration 219*a*, scene metadata 219*b* that may include a timestamp 219*c*, scene type 219*d*, audio category 219*e*, an analysis score 219*f*, and a scene category 219*g*. Scene criteria may include a scene type that includes violence, explosion, graphic (violence or sex), and nudity, for example. Further, the scene criteria may include audio categories that include violence, explosion, graphic (violence or sex), loud (volume), for example. In some embodiments, if the analysis score is above a threshold, as described herein, the media processor 208 and/or the mobile device 215 may omit, blur, or otherwise adjust the media content including the scene associated with metadata 219 to be presented on respective display 210, 216.

Referring to FIG. 2A, in one or more embodiments, the video content management server 202 may provide, over communication network 206, the media content and the metadata 219 to the media processor 208. Further, the media processor 208 may detect or identify the metadata 219 as well as analyze the specific information within the metadata 219. In addition, the media processor 208 may adjust the media content according to the metadata 219 resulting in an adjusted media content. Also, the media processor 208 may present the adjusted media content on the display 210 to be viewed by user 212, accordingly.

In one or more embodiments, the video content management server 202 may provide, over communication network 206, the media content and the metadata 219 to the mobile device 214. Further, the mobile device 214 may detect or identify the metadata 219 as well as analyze the specific information within the metadata. In addition, the mobile device 214 may adjust the media content according to the metadata 219 resulting in an adjusted media content. Also, the mobile device 214 may cast, mirror, or present the adjusted media content on the display 216 to be viewed by user 218, accordingly.

In one or more embodiments, the adjusting of the media content by the media processor 208 or mobile device 214 may include omitting a scene according to the metadata 219. That is, the media processor 208 or mobile device 214 may determine the analysis score 219*f* from the metadata 219 and determine that the analysis score 219*f* is above a threshold (e.g., 7.5) indicating the scene is unsuitable for children, for example. In some embodiments, the analysis score may be determined based on factors such as the video content management server detecting the viewers of display 210, 216 based on the detecting the presence of the mobile devices associated with the viewers. That is, if a viewer is a young child, the amount of profanity, violence, and sex maybe less tolerated in a scene than a viewer is a teenager. Further, the media processor 208 and the mobile device 214 may present the media content omitting the scene. Also, the media processor 208 or mobile device 214 may present a notification on display 210, 216 to be viewed by user 212, 218 indicating the omitting of the scene from the presentation of the media content. In other embodiments, the notification may be sent to another communication device such as a mobile device of a parent of the viewer, who may be a child.

In one or more embodiments, a media content provider that provides the service of detecting scenes that are unsuitable with the media content and not presenting them on the display 210, 216 (or otherwise adjusting the media content), may appropriate a benefit for providing such a service to user 212, 218. In some embodiments, the media processor 208 or mobile device 214 may present an advertisement in place of the omitted scene within the media content. That is, the media content may sell advertisements to advertisers thereby recouping a financial benefit to provide this service to user 212, 218. In further embodiments, the advertisement may be provided via an auction and advertisement server, which is based, in part, on characteristics associated with the media content such as a movie that is a crime drama and the and the omitted scene is a car chase such that the advertisement may be for a particular type of car shown in the movie.

In one or more embodiments, the media processor 208 or mobile device 214 may present a scene summary in place of the omitted scene in the media content. The scene summary may be included in metadata 219. In some embodiments, the scene summary may be a text only summary. In other embodiments, the scene summary may include still image or video highlights without including unsuitable images (e.g., show crime victim on street instead of attack of crime victim). The still image or video highlights may be generated by the video content management server and a link to the still image or video highlight may be provided in the metadata that may be retrieved by the media processor 208 or mobile device 214 and presented on display 210, 216, accordingly.

In one or more embodiments, the adjusting of the media content by the media processor 208 or mobile device 214 may include blurring portions of a scene that may be unsuitable for children according to the metadata 219. That is, the media processor 208 or mobile device 214 may determine the analysis score 219f from the metadata 219 and determine that the analysis score 219f is above a threshold (e.g., 7.5) indicating the scene is unsuitable for children, for example. The media processor 208 or mobile device (or in some embodiments, the video content management server 202) may identify unsuitable portions of the scene utilizing one or more image recognition techniques to blur. Further, the media processor 208 and the mobile device 214 may present the media content with the blurred scene when presenting the media content. In additional embodiments, a blurred scene may include blurring portions of video frames of the scene but leaving remainder of the frames unblurred. In further embodiments, in addition or instead of visual images of the scene being blurred, audio content associated with the scene may be dubbed, suppressed, or removed to prevent unsuitable audio content (e.g., profanity) to be presented. Also, the media processor 208 or mobile device 214 may present a notification on display 210, 216 to be viewed by user 212, 218 indicating the blurring of the scene when presenting the media content. In addition, the media processor 208 or mobile device 214 may present an advertisement prior to presenting the blurred scene.

In one or more embodiments, the media processor 208 or mobile device 214 may provide the scene that was omitted or blurred during the presentation of the media content, over a communication network 206, to a digital video recorder (DVR) to be viewed by user 212, 218 when children are not present. Further, the media processor 208 or mobile device 214 may receive user-generated input to retrieve the omitted or blurred scene from the DVR. In addition, the media processor 208 and the mobile device 214 may obtain the omitted or blurred scene from the DVR. Also, the media processor 208 or mobile device 214 may present the omitted or blurred scene retrieved from the DVR on display 210, 216, accordingly.

Figure 2C:
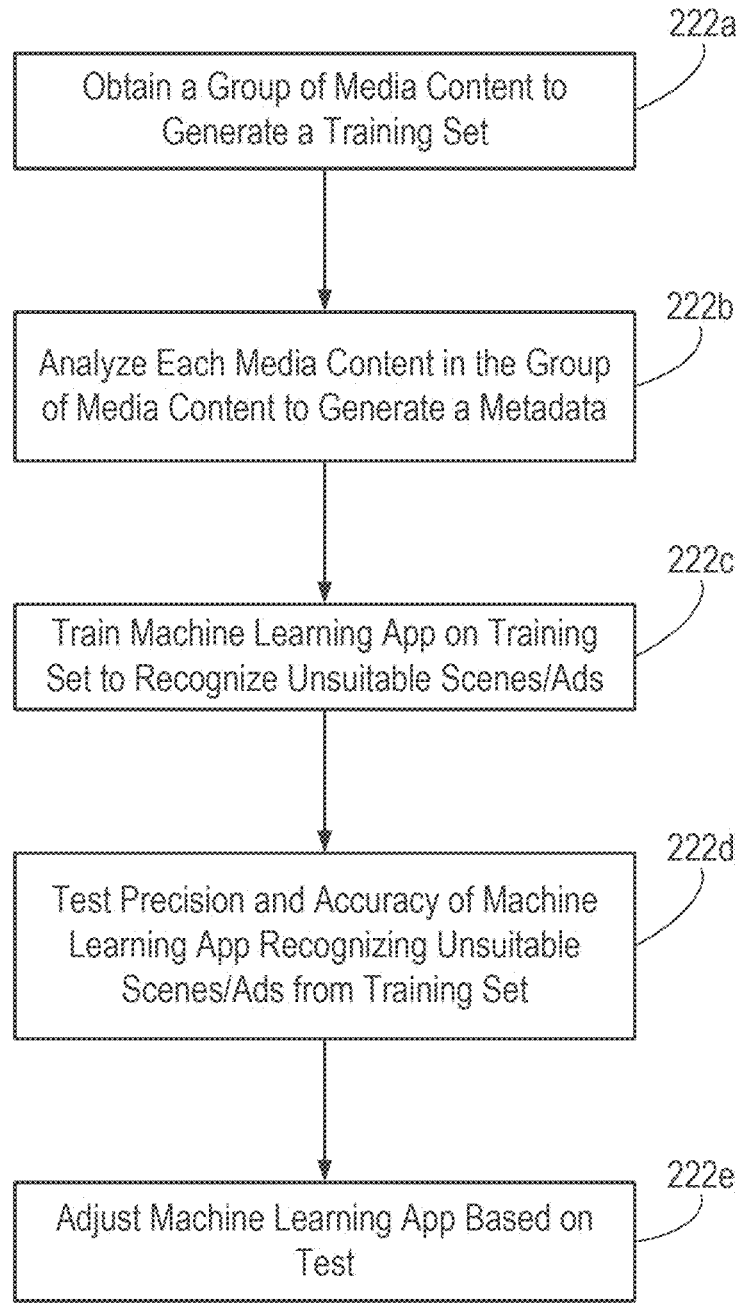
FIGS. 2C-2E depicts illustrative embodiments of processes in accordance with various aspects described herein.
Figure 2D:
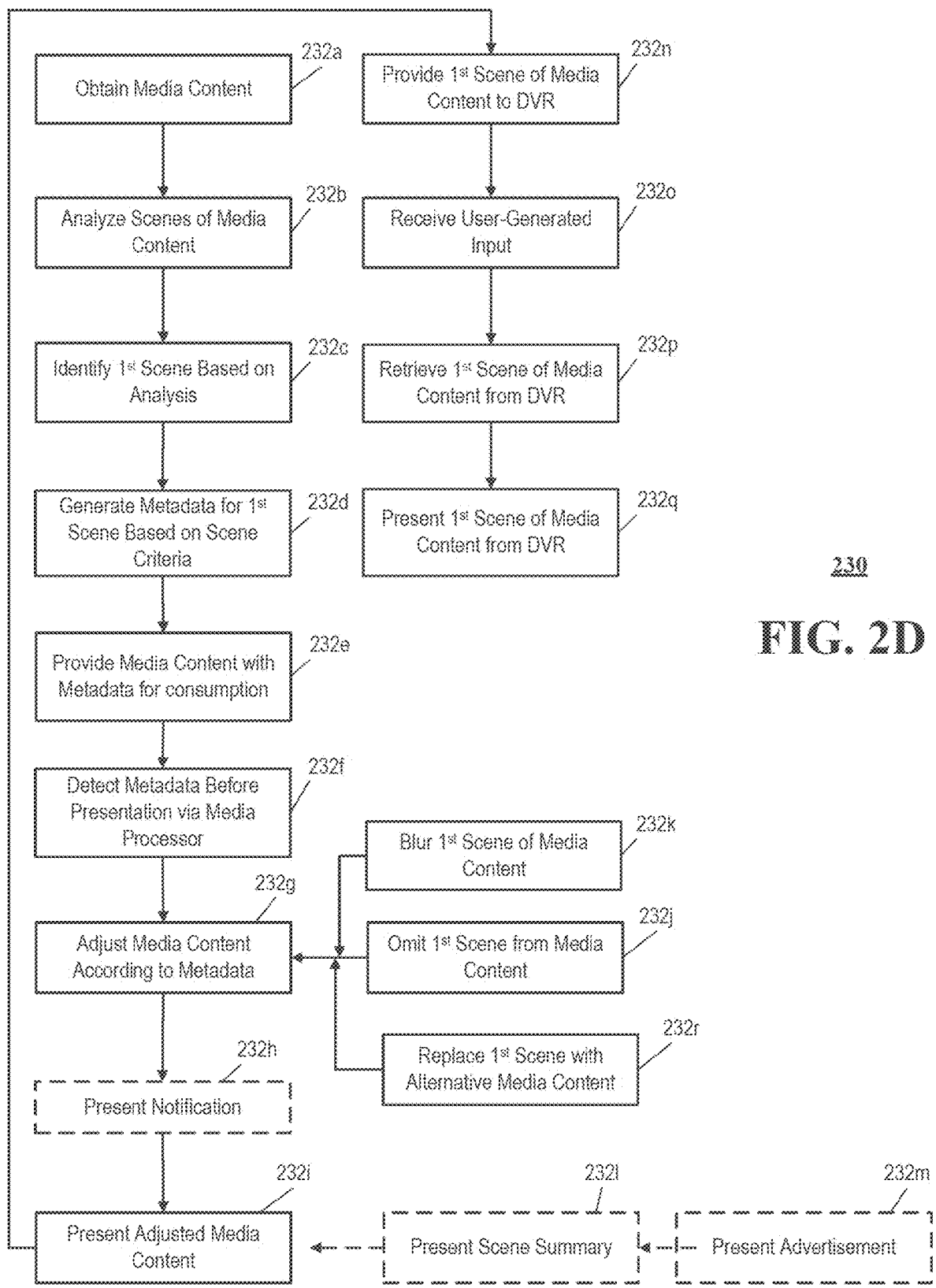
Figure 2E:
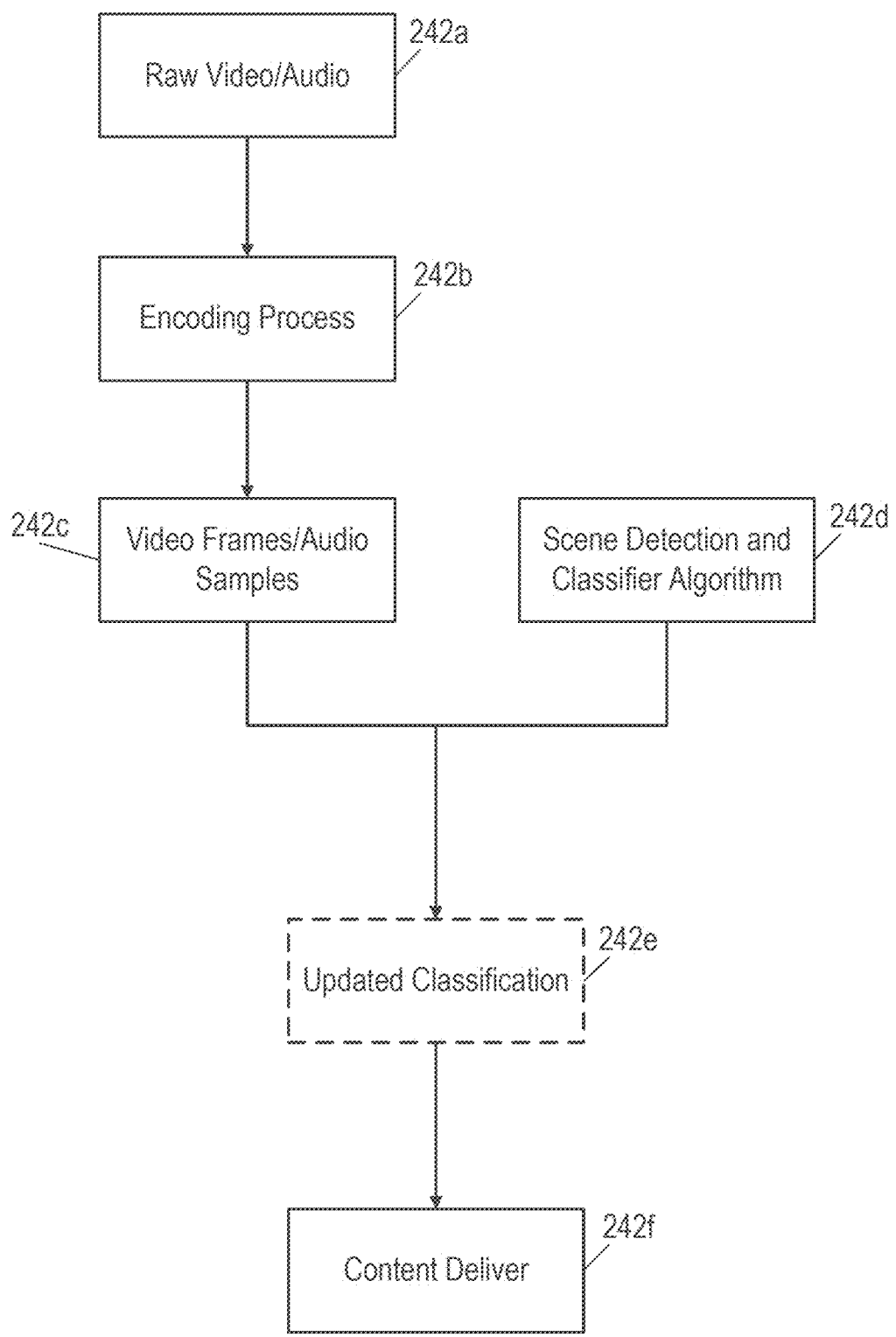

FIGS. 2C-2E depicts illustrative embodiments of processes in accordance with various aspects described herein. Referring to FIG. 2C, in one or more embodiments, portions of the method 220 may be implemented by a video content management server, media processor, or mobile device described herein. Further, the process 220 may include the video content management server, media processor, or mobile device, at 222a, obtaining a group of media content to generate a training set for a machine learning application. Further, the machine learning application is utilized by a media content service provider to provide a service of recognizing an unsuitable portion of media content (e.g.) and adjusting the media content to omit, blur, or other obscure the unsuitable portion of the media content. In addition, the process 220 may include the video content management server, media processor, or mobile device, at 222b, analyzing each media content in the group of media content to generate metadata for a portion of the group of media content to indicate that the portion of the group of media content includes an unsuitable scene for children. Also, the process 220 may include the video content management server, media processor, or mobile device, at 222c, training the machine learning application on the training set to recognize unsuitable scenes. Further, the process 220 may include the video content management server, media processor, or mobile device, at 222d, testing the precision and accuracy of the machine learning application recognizing unsuitable scenes or advertisements from the training set. This may include tracking the percentage of times the machine learning application correctly makes such a recognition and determining whether the percentage is above or below a threshold. If the percentage is above the threshold, then the training of the machine learning application may be determined to be complete and applied to media content for providing the media content service. In addition, the process 220 may include the video content management server, media processor, or mobile device, at 232e, adjusting the machine learning application based on the test of precision and accuracy (e.g., the percentage is below the threshold). This may include providing further media content to the training set to assist in the machine learning application to recognize unsuitable scenes.

Referring to FIG. 2D, in one or more embodiments, portions of process 230 may be implemented by a video content management server, media processor, or mobile device. The process 230 may include the video content management server, at 232a, obtaining, over a first communication network, media content from a media content repository. The media content may include a group of scenes. Further, the process 230 may include the video content management server, at 232b, analyzing each of the group of scenes of the media content utilizing an image recognition technique based on a scene criteria resulting in an analysis. In addition, the process 230 may include the video content management server, at 232c, identifying a first scene of the group of scenes based on the analysis. Also, the process 230 may include the video content management server, at 232d, generating metadata associated with the first scene according to the scene criteria. The metadata indicates that the first scene is unsuitable for children. Further, the process 230 may include the video content management server, at 232e, providing, over a second communication network, the media content, and the metadata to a media processor.

In one or more embodiments, the process 230 may include the media processor or mobile device, at 232f, detecting, identifying, or analyzing the metadata. The detection may occur during and/or before presentation via a media processor. Further, the process 230 may include the media processor or mobile device, at 232g, adjusting the media content according to the metadata resulting in an adjusted media content. In some embodiments, the process 230 may include the media processor or mobile device, at 232j, omitting the first scene according to the metadata. In further embodiments, the media processor adjusting the media content includes omitting the first scene according to the metadata. In other embodiments, the process 230 may include the media processor or mobile device, at 232k, blurring portions of the first scene according to the metadata resulting in a blurred first scene. In additional embodiments, the media processor adjusting the media content includes blurring portions of the first scene according to the metadata resulting in a blurred first scene. Further, the process 230 may include the media processor or mobile device, at 232h (shown in phantom), optionally presenting a notification regarding the adjustment of the media content. In some embodiments, the presenting of the notification may include presenting a notification of the omission of the first scene on the display. In other embodiments, the presenting of the notification may include presenting a notification of the blurring of first scene on the display.

In one or more embodiments, the process 230 may include the media processor or mobile device, at 232i, presenting the adjusted media content on the display communicatively coupled to the media processor. Further, the metadata includes a scene summary of the first scene. In addition, the process 230 may include the media processor or mobile device, at 232*l* (shown in phantom), optionally presenting the scene summary in place of the first scene. Also, the process 230 may include the media processor or mobile device, at 232*m* (shown in phantom), optionally presenting an advertisement prior to the adjusted portion (e.g., first scene) of the adjusted media content. In some embodiments, the media processor presents an advertisement in place of the first scene. In other embodiments, the media processor presents an advertisement prior to presenting the blurred first scene.

In one or more embodiments, the process 230 may include the media processor or mobile device, at 232*n*, providing, over the second communication network, the first scene to a digital video recorder (DVR). Further, the process 230 may include the media processor or mobile device, at 232*o*, receiving user-generated input indicating to retrieve the first scene from the DVR. In addition, the process 230 may include the media processor or mobile device, at 232*p*, retrieving or obtaining the first scene from the DVR. Also, the process 230 may include the media processor or mobile device, at 232*q*, presenting the first scene on the display that was retrieved or obtained from the DVR.

Referring to FIG. 2E, in one or more embodiments, portions of process 240 may be implemented by a video content management server, media processor, or mobile device. The process 240 may include the video content management server, at 242*a*, obtain the raw media content (e.g., video content, audio content, or audiovisual content), or media content that does not have metadata for unsuitable scenes for children associated with it. Further, the process 240 may include the video content management server, at 242, processing or encoding the raw media content, which may include generating metadata regarding unsuitable scenes for children within the raw media content. The encoding or processing may include associating the metadata with the unsuitable scene within the raw media content. In addition, the encoding or processing may include, at 242*c*, obtaining the video frames and/or audio samples of the raw media content. Further, the process 240 may include the video content management server, at 242*d*, implementing a scene detection and classifier algorithm utilizing a machine learning application, as described herein, to detect unsuitable scenes for children within the raw media content. In addition, the process 240 may include the video content management server, at 242*e* (shown in phantom), optionally updating the classification of the unsuitable scene in the generated metadata. Also, the process 240 may include the video content management server, media processor, or mobile device, at 242*f*, delivering the media content with the metadata and either omitting the unsuitable scene or blurring portions of the unsuitable scene according to the metadata when presenting the media content.

In some embodiments, the process 230 may include, at 232*r*, modifying the first scene to obtain an adapted scene. It is understood that adaptation may include replacement of the first scene with a replacement scene. The replacement or adapted scene may include alternative media content, e.g., replacing an actor performing an objectionable activity in the scene with an avatar performing no activity or a suitable replacement activity that preserves a story line and/or thematic content of the scene. In at least some embodiments, the modification, adaptation and/or replacement may be performed in whole or at least in part by one or more of the media processor or mobile device.

Figure 2F:
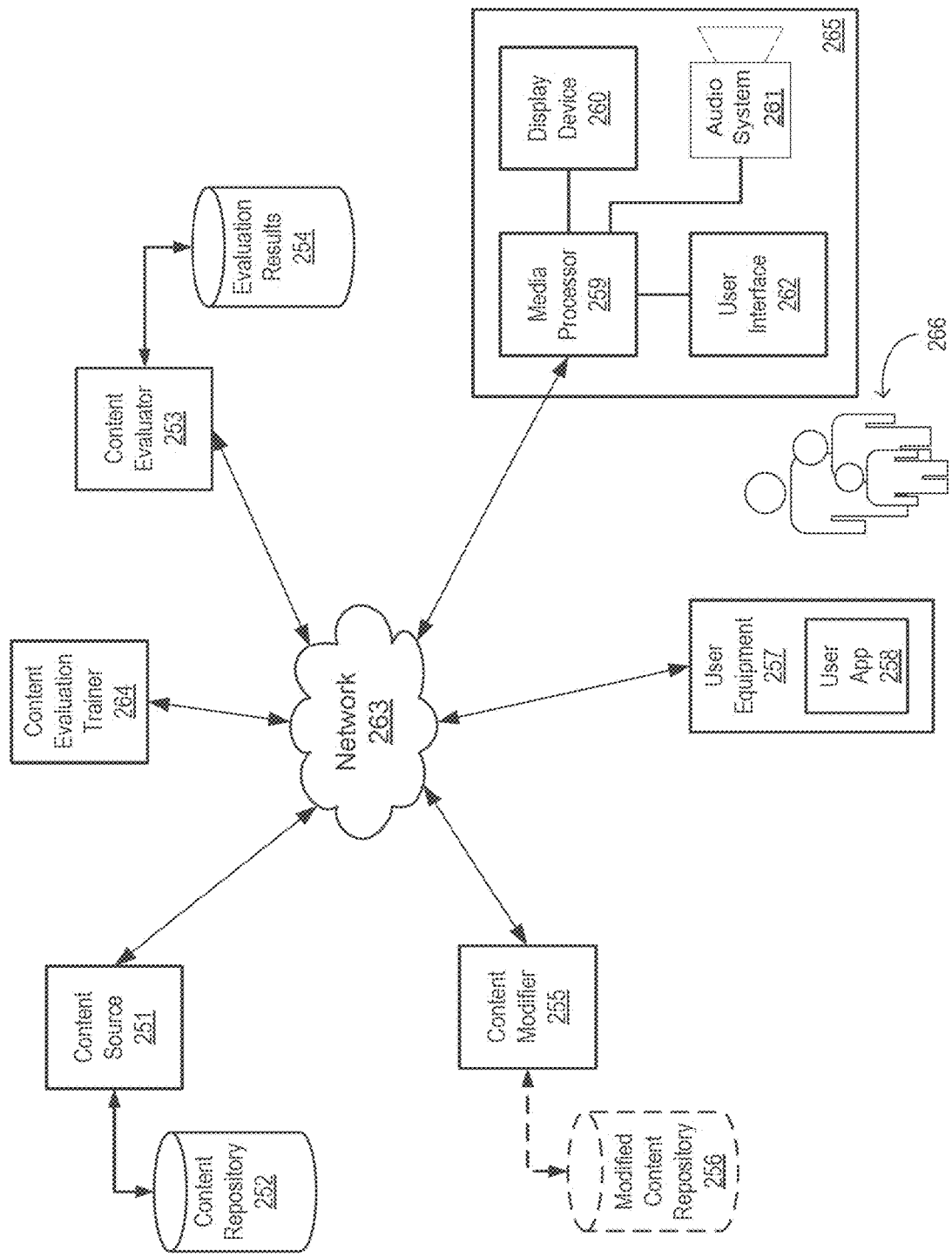
FIGS. 2F-2G are block diagrams illustrating other aspects of an example, non-limiting embodiment of a system functioning within the communication network of FIG. 1 in accordance with various aspects described herein.

FIG. 2F is a block diagram illustrating another aspect of an example, non-limiting embodiment of a media alteration system 250 functioning within the communication network of FIG. 1 in accordance with various aspects described herein. The example media alteration system 250 includes a content source 251 in communication with a content repository 252 adapted for storage of media content. The example media alteration system 250 also includes a content evaluator 253 in communication with an evaluation results repository 254 a content evaluation trainer 264 and a content modifier 255 optionally in communication with a modified content repository 256 (shown in phantom). According to the example media alteration system 250, media content, including media content that has been modified and/or otherwise adapted according to the techniques disclosed herein, may be provided to media presentation equipment 265. The media presentation equipment 265 may include one or more of a media processor 259, a display device 260 and/or an audio system 261.

It is understood that, without limitation, one or more of the media processor 259, the display device 260 and the audio system 261 may include any of the media processing devices disclosed herein and/or otherwise known to those of ordinary skill in the art, including a home entertainment system, a smart TV, a workstation computer, a laptop computer, a tablet device, a mobile phone, and the like. One or more of the media processor 259, the display device 260 and the audio system 261 may be integrated within a common platform, such as a tablet device or smart phone. Alternatively or in addition, one or more of the media processor 259, the display device 260 and the audio system 261 may be a separate device, e.g., as part of a modular home entertainment system and/or component configuration in which the devices may be in communication through one or more of local cabling and/or a local wireless network, e.g., a BlueTooth® personal wireless network.

It is understood that a user media presentation system may also include a user interface 262 to facilitate operation of the media presentation system and/or system components. The user interface 262 may include, without limitation, an interactive application that presents information via the display device 260 and/or the audio system 261. For example, the user interface 262 may include a virtual assistant, such as a virtual assistant using artificial intelligence (AI) technology. Alternatively or in addition the user interface 262 may include a touchscreen and/or gesture recognition system that may include one or more cameras and/or microphones adapted to obtain input via user utterances and/or motions. In at least some embodiments, the user interface 262 includes a remote-control device. The remote-control device may be a dedicated remote control adapted to control one or more of the media processor 259, the display device 260 and the audio system 261. In at least some embodiment, the remote control may include an application adapted to run on another device, such as a computer, a tablet device, a smartphone, and the like.

The example media alteration system 250 may also include user equipment 257 including a user application 258 that may be adapted to facilitate user interaction with one or more system elements, such as the content source 251, the content evaluator 253, the content evaluation trainer 264, the content modifier 255 and/or the media presentation equipment 265. The user equipment 257 may include any suitable processing device, including the example devices disclosed herein and/or otherwise known to those of ordinary skill in the art, including a home entertainment system, a smart TV, a workstation computer, a laptop computer, a tablet device, a mobile phone, and the like.

One or more of content source 251, the content evaluator 253, the content evaluation trainer 264, the content modifier 255 the entertainment system 265 and/or the user equipment 257 may be communicatively coupled via any combination of cabling and/or wireless communication, either locally and/or remotely, e.g., via one or more networks, e.g., including the example network 263. Networks may include personal area networks, including any of the IEEE 802.11 compliant wireless networks, e.g., a near-field communication protocol, a BlueTooth network, a WiFi network, mobile cellular communications, e.g., over licensed and/or unlicensed portions of the RF spectrum, for example using any suitable protocol, e.g., LTE, 3G, 4G, 5G and the like. Alternatively or in addition, communication channels may local area networks, e.g., utilizing an Ethernet protocol and/or wide area networks, such as the Internet.

An individual user and/or group of users 266 may consume media content on the media entertainment system 265. Consider a home entertainment system 265 that may be utilized by different member of a family including adults, adolescents, teens, and any combination thereof. A family member, such as a parent may choose to impose a rating system to control what types and/or categories of content one or more family members may be exposed to. For example, a parent may access a rating application 258 via a smart phone and/or home computer. The rating application 258 may be resident on the user equipment 257 and/or accessed via a portal to one or more of the other devices 251, 253, 264, 255. The parent may be presented with a listing of different categories from which to choose any that may be objectionable. The parent may choose to identify illicit drug usage and sexual content as objectionable categories using the application 258.

It is envisioned that such selections may be made in a general sense, for example, being stored and/or otherwise retained in a personal profile. Alternatively or in addition, such selections may be made in association with selection of a particular media content item. For example, a parent may choose to permit and/or otherwise authorize a younger family member to watch a movie known to have mature content. Upon selection of the movie, the parent may be presented with a listing of all predetermined objectionable categories or a subset of predetermined objectionable categories predetermined to be present within the movie. The parent may select any objectionable categories to be adapted and/or otherwise made suitable. In at least some embodiments, suitability may also be determined based upon a suitability criteria, e.g., an age group, and/or user preference. Accordingly, the same objectionable content may be adapted differently based upon the suitability criteria. Such suitability criteria may be used to select an age-appropriate avatar to be used in any adapted scene(s) and/or age-appropriate language to be provided in any adapted scene(s).

The content source 251 may include a media server of a media service, e.g., a Hulu® media service, a Netflix® media service, and/or a YouTube® media service. Although the media content repository 252 is shown as being local to the content source 251, it is understood that the repository 252 may be accessed via network, such as the example 263. Likewise, although the evaluation results 254 and modified content repository are illustrated as being local to the content evaluator 253 and the content modifier 255, respectively, it is understood that the repositories 254, 256 may be accessed via one or more other networks, such as the example 263.

Figure 2G:
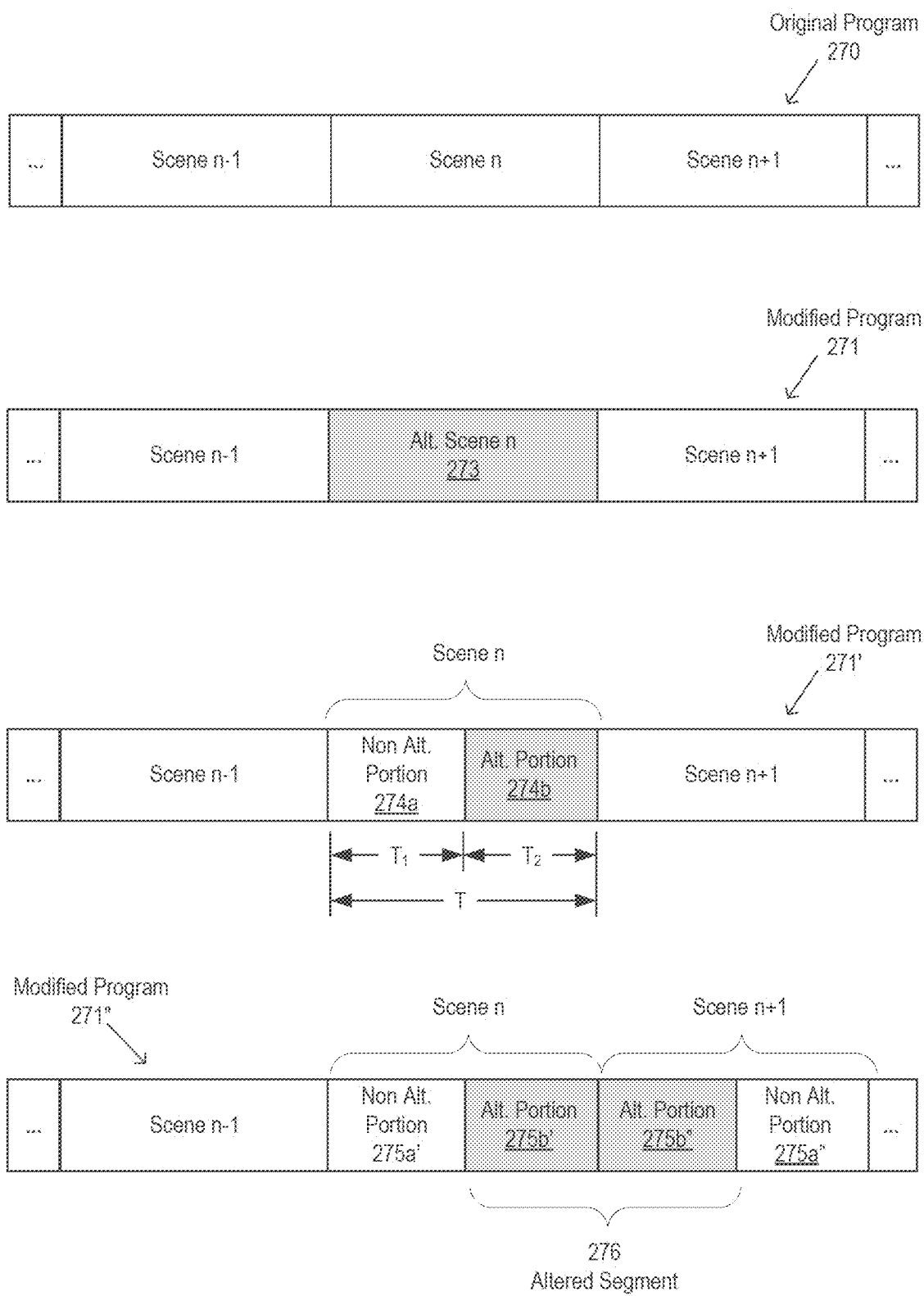

FIG. 2G is a block diagram illustrating another aspect of an example, non-limiting embodiment of a system functioning within the communication network of FIG. 1 in accordance with various aspects described herein. Here, an original media content item, such as an original program 270 includes a sequence of scenes: scene$_{n-1}$, scene$_n$, scene$_{n+1}$ and so on. As disclosed herein a pre-processed version of the original program 270 may include metadata that identifies one or more predetermined objectionable categories as may be included within the original program. The metadata may identify such objectionable content on a scene-by-scene basis, such that an inspection of the metadata for a particular scene may identify which, if any, of the predetermined objectionable categories may be present within that particular scene. According to the techniques disclosed herein, a modified program 271 may be prepared in which a scene having been identified, e.g., through the metadata, as including objectionable content, may be replaced with an adapted scene 273 providing suitable, appropriate, acceptable or apt scene that removes the objectionable content, while presenting modified content that minimizes any impact such a scene adaptation may have on an impression and/or understanding of the original program 270, e.g., as a whole.

In at least some embodiments, it is preferred to apply adapted content sparingly, as greater adaptation may run a risk of detracting from the original program 270. In such instances, a particular scene$_n$, having a duration, T, may include a first scene portion of duration $T_1$, in which there is no objectionable content and a second scene portion of duration of $T_2$ in which the objectionable content is present. In such instances, the metadata may identify that portion of a scene during which the objectionable content is present and/or that portion of a scene during which the objectionable content is not present to permit a sub-scene adaptation process. According to the illustration, the first portion of the scene$_n$ is preserved as a non-altered portion 274a of duration $T_1$, whereas, only that portion of the scene is altered as necessary to obtain an altered portion 274b of duration $T_2$.

A further example of a modified program 271" is presented in which the objectionable content may span more than one adjacent scene. In such instances, it is understood that portions of one or more of the adjacent scenes may be adapted to remove objectionable content, while preserving other portions of the scenes that do not include objectionable content. According to the illustrative example, the modified program 271" includes a non-adapted first portion 275a' of scene$_n$. Likewise, the modified program 272" includes a non-adapted first portion 275a" of scene$_{n+1}$. The scene$_n$ also includes a second altered portion 275b' and scene$_{n+1}$ includes a second altered portion 275b". The second altered portions 275b', 275b" for a contiguous altered segment 276 that spans adjacent scenes, while maintaining altered content to that which is necessary.

Figure 2H:
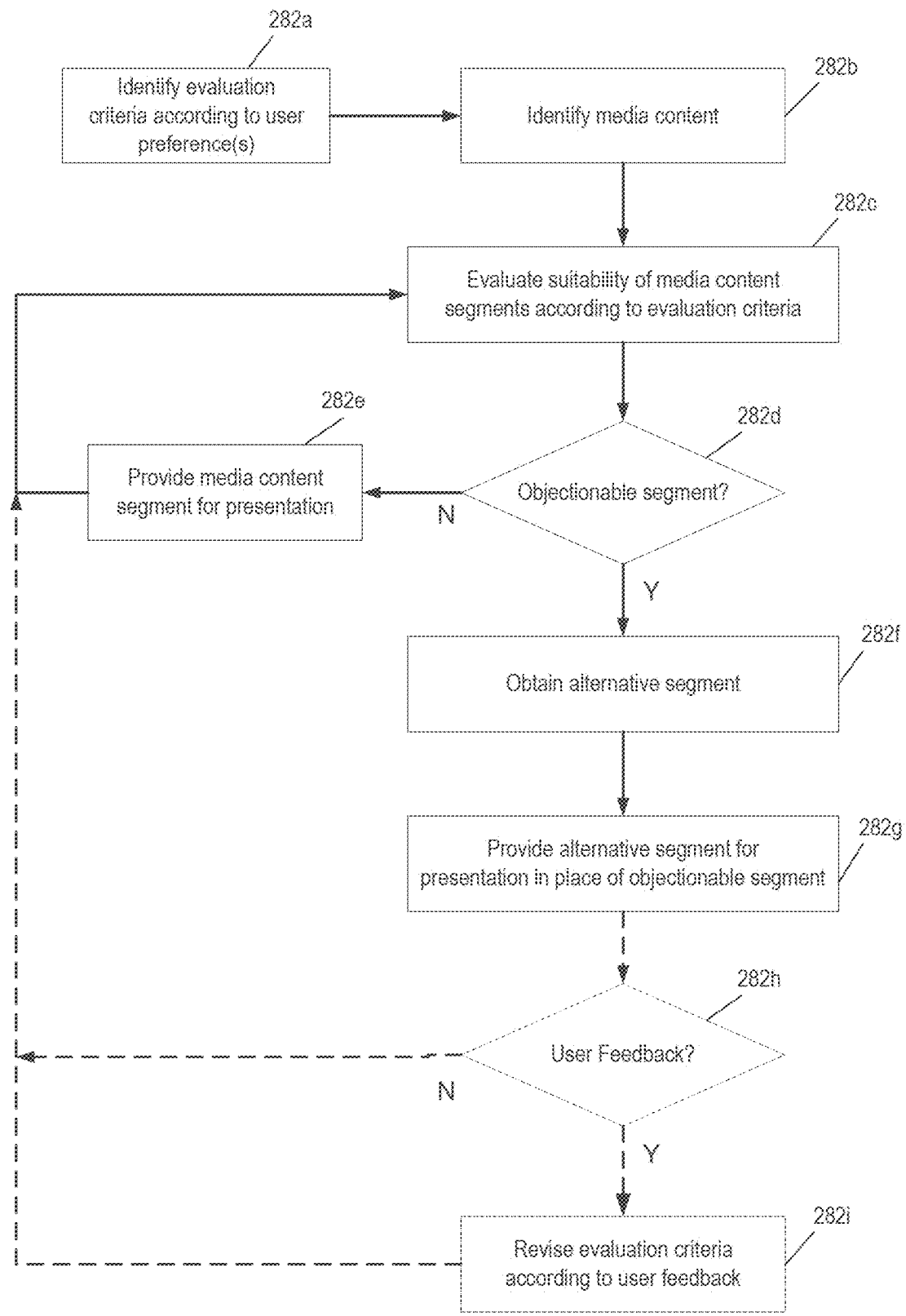
FIG. 2H depicts an illustrative embodiment of another process in accordance with various aspects described herein.

FIG. 2H depicts an illustrative embodiment of another process 280 in accordance with various aspects described herein. According to the example process 280, evaluation criteria is identified at 282a. The evaluation criteria may be identified according to user preferences, e.g., as obtained via a user interface and/or content adaptation application. It is envisioned that the evaluation criteria may be obtained responsive to user selections as may be obtained during an account and/or application configuration phase. In at least some embodiments, such selections may be retained in a user profile. It is understood that an individual user may identify different evaluation criteria to be applied under different circumstances. For example, one criteria may be applied to an individual user viewing in an individual context, and another criteria when viewing in a group setting that may include individuals having different evaluation criteria. In at least some embodiments, evaluation criteria may be formed according to a joint evaluation criteria of more than one individuals. A joint evaluation criteria may be determined according to one or more rules, e.g., taking a most sensitive and/or conservative evaluation criteria among the group of individuals.

Continuing with the example process 280, a media content item may be identified at 282b. The media content item may include one or more of video and audio content. The media content item may be a pre-recorded and/or produced program, such as a feature length film, a short film, a television and/or cable program, e.g., according to a serial of similar programs and so on. Alternatively or in addition, the program may include unscripted content and/or minimally scripted content, such as pre-recorded sporting events, news events and/or reality programs. In at least some embodiments, the media content may include a contemporaneously generated content, e.g., via a live or near-real time presentation or broadcast that may include a few seconds or minutest of delay to permit at least some level of evaluation and adaptation. Media content may include, without limitation, and media content, including pre-programmed and/or pre-scheduled content available according to a broadcast and/or program guide, video on demand, pay-per-view, and the like. It is envisioned that the media content may be identified by a user selection from a video catalog and/or program guide, a tuning of a media processor and/or a digital video recorder (DFR) to one or more channels, and so on.

An evaluation of the selected media content for suitability is performed at 282c. For example, the selected media content may be evaluated on a segment-by-segment and/or scene-by-scene basis to identify one or more segments and/or scenes according to the evaluation criteria identified at 282a. A test of the scene, e.g., according to a real-time evaluation and/or metadata, compared one or more categories of the segment or scene to the evaluation criteria. To the extent the evaluation criteria identifies objectionable categories of a listing of predetermined categories, the test of the scene may conclude that a particular segment or scene includes objectionable material. To the extent it is determined at 282d that the segment and/or scene does not contain objectionable material, the segment and/or scene is provided at 282e for presentation. However, to the extent it is determined at 282d that the segment and/or scene does contain objectionable material, the process 280 continues by obtaining an adapted and/or alternative segment and/or scene at 282f.

The obtaining of the adapted and/or alternative segment and/or scene at 282f may include obtaining a previously adapted segment and/or scene, e.g., from an adapted scene repository and provided for presentation, at 282g, in place of the original segment. Such adapted scenes may be identified by the corresponding program and a location of the segment and/or scene within the program. Alternatively or in addition, the adapted scenes may be further identified according to a categorization of the adapted scene. It is envisioned that in at least some embodiments, the adapted segments and/or scenes are evaluated, e.g., by the trained neural network, to categorize the adapted scene according to the list of predetermined categories. In this manner adapted scenes may be prepared to different degrees of suitability, thereby permitting a bespoke adaptation according to selections of a particular user at a given time and under given circumstances.

Alternatively or in addition, the obtaining of the adapted and/or alternative segment and/or scene at 282f may include generating an adapted segment and/or scene, e.g., responsive to the user evaluation criteria. The newly generated adapted segment and/or scene may be provided for presentation, at 282g, in place of the original segment. Alternatively or in addition, the newly generated adapted segment and/or scene may be evaluated for suitability, e.g., at 282c, and provided for presentation and/or further modified, as may be necessary, at 282f.

Without limitation, the providing of the segment or scene at 282e and/or the providing of the alternative segment for presentation may include forwarding the scene to a media processor for presentation on a display device and/or audio system. Alternatively or in addition, the providing of the segment and/or scene at 282e may include including the scene in a modified version of the original program that may be forwarded for presentation, recording and/or otherwise stored for a later presentation. It is envisioned that a modified program may be generated, e.g., stitched together from original and adapted segments and/or scenes according to user selections of objectionable categories. The modified version may be forwarded to the user responsible for making the particular selections. Alternatively or in addition, the modified version may be retained and/or otherwise stored and available to the same or different user who may request the same program according to the same user selections, e.g., the same or similar evaluation criteria. In the latter scenario, an adaptation process may compare user selections to a record of previous user selections to determine a match. To the extent a match is determined, a previously adapted and stored version of the original program may be served and/or otherwise provided in response to the user request.

In at least some embodiments, the process 280 includes a provision for user feedback. For example the process 280 monitors for user feedback and to the extent it is determined at 282h (shown in phantom) that there is no user feedback, the process 280 continues from 282c by evaluating other segments and/or scenes of the identified media content. To the extent it is determined at 282h (shown in phantom) that there is user feedback, the process 280 may revise evaluation criteria, at 282i (also shown in phantom), according to the feedback, followed by continuing from 282c by evaluating other segments and/or scenes of the identified media content according to the revised evaluation criteria. A revision of the evaluation criteria may include a retraining of a machine learning processor, e.g., a retraining of a previously trained neural network. It is envisioned that retraining may be applied according to a group, e.g., all users, all users of a common affinity group and so on. Alternatively or in addition, it is envisioned that retraining may be applied to an individual basis in which a pre-trained neural network may be further modified and/or adapted according to a particular user's preferences and/or idiosyncrasies.

While for purposes of simplicity of explanation, the respective processes are shown and described as a series of blocks in FIGS. 2C, 2D, 2E, and 2H it is to be understood and appreciated that the claimed subject matter is not limited by the order of the blocks, as some blocks may occur in different orders and/or concurrently with other blocks from what is depicted and described herein. Moreover, not all illustrated blocks may be required to implement the processes described herein. Further, one or more blocks may be implemented in response to another block.

Portions of embodiments described herein may be combined with other portions of embodiments described herein.

The devices, systems, processes and software disclosed herein provide means that allow a particular user to identify how much of one or more categories, such as violence, nudity, graphic scenes, explosion, etc., the particular user finds objectionable. Such objectionable or otherwise problematic scenes may be automatically identified and intelligently replaced with suitable replacement scenes, e.g., including avatar-based scenes that may be generated based on user preferences. Such characterization and evaluation of media content according to a segment-by-segment and/or a scene-by-scene account provide a content consumer with a much more granular description of genre that might otherwise be available according to other available rating schemes.

It is envisioned that in at least some embodiments, the scene classifier 180 and/or the scene evaluation server 253 may undergo a training phase in which a user is presented with multiple scenes for classification. According to the training, the user may classify each scene, e.g., as "suitable" or "not suited for my viewing." In this manner, a machine learning algorithm may learn preferences of a particular user (or class of users). When a scene recognition algorithm, e.g., trained according to the machine learning algorithm, sees similar scenes, it may identify, e.g., "flag" them as problematic scenes. A content modification algorithm may replace and/or otherwise modify those scenes with adapted and/or replacement content. In at least some embodiments, the replacement content includes avatar-based scenes. The replacement content, e.g., the avatar-based scenes, may be obtained and/or otherwise generated in real time or near real time, e.g., "on the fly." Alternatively or in addition at least some of the replacement content including the avatar-based scenes may be generated beforehand. It is further envisioned that multiple different levels of replacement scenes may be generated for one particular scene that may be characterized according to different categories of unsuitability).

The adapted and/or replacement scenes are adapted in a manner that allow a viewer to consume the adapted media content with minimal interruption, distraction and/or discontinuity. For example, modified scenes are adapted to follow a storyline of the media content, without being subjected to the particular unsuitable material. Such intelligent adaptations permit a viewer to understand or get the "gist" of an original unsuitable scene by way of the altered or adapted scene. Consider a scene in which a bad guy gets killed in a graphic illustration in the original media program. The replacement content may represent the bad guy getting killed, but without subject the viewer to some unpalatable aspect, e.g., blood, violent action. Thus, a scene of a human killing a human, with violence and blood and gore, may be replaced by an avatar-based scene that may remove the human aspect from the action. In at least some embodiments, the replacement segment or scene aptly describes the original scene, but in an avatar context. This allows a modified media program to transition to the avatar-based scene to avoid objectionable subject matter, automatically reverting back to the actual scene when the objectionable scene has concluded. Audio and video may be controlled together or separately. For example, an avatar-bases scene may include the original audio. Likewise, an original video portion may include a modified audio portion.

According to an example application, a viewer may press ORDER or PLAY for a selected video program. Responsive to this action the viewer may be presented with an option, e.g., indicating: "There are some scenes that have been replaced based on viewer preferences. Do you wish to see the replacement version?" It is understood that there may be more than one replacement criteria, so there may be more than one version of replacement scenes. In either event, the user may be allowed to review scene selection criteria before playing to provide an opportunity to accept, reject and/or modify. Note, if the viewer chooses modification, then a modification server may generate and/or otherwise obtain replacement sections as may be necessary and recue the program with the revised replacement scenes.

Referring now to FIG. 3, a block diagram is shown illustrating an example, non-limiting embodiment of a virtualized communication network 300 in accordance with various aspects described herein. In particular a virtualized communication network is presented that may be used to implement some or all of the subsystems and functions of system 100, the subsystems and functions of system 200, and processes 220, 230, 240 and 280 presented in FIGS. 1, 2A-2E, 2H and 3. For example, the virtualized communication network 300 may facilitate in whole or in part improving a user's experience by utilizing machine learning to detect and adjust unsuitable scenes for a user when viewing media content. For example, an unsuitable segment of a program may be detected from metadata of the program that has been generated responsive to an application of a neural network trained to identify unsuitable content. Adjustment of the program segment may take one or more of a variety of forms adapted to overcome the unsuitability, while preserving continuity of the program, e.g., replacing the unsuitable segment or scene with an overlay and/or a replacement segment in which an avatar provides suitable dialogue and/or action to replace the unsuitable scene.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc., that perform some or all of the functions of network elements 150, 152, 154, 156, etc. For example, the network architecture may provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure may include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services may be implemented as cloud-centric workloads.

As an example, a traditional network element 150 (shown in FIG. 1), such as an edge router may be implemented via a VNE 330 composed of NFV software modules, merchant silicon, and associated controllers. The software may be written so that increasing workload consumes incremental resources from a common resource pool, and moreover so that it is elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to one or more content sources 175 for distribution of content to any or all of the access technologies. In particular, in some cases a network element needs to be positioned at a specific place, and this allows for less sharing of common infrastructure. Other times, the network elements have specific physical layer adapters that may not be abstracted or virtualized and might require special DSP code and analog front-ends (AFEs) that do not lend themselves to implementation as VNEs 330, 332 or 334. These network elements may be included in transport layer 350.

The virtualized network function cloud 325 interfaces with the transport layer 350 to provide the VNEs 330, 332, 334, etc., to provide specific NFVs. In particular, the virtualized network function cloud 325 leverages cloud operations, applications, and architectures to support networking workloads. The virtualized network elements 330, 332 and 334 may employ network function software that provides either a one-for-one mapping of traditional network element function or alternately some combination of network functions designed for cloud computing. For example, VNEs 330, 332 and 334 may include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers, and other network elements. Because these elements do not typically need to forward large amounts of traffic, their workload may be distributed across a number of servers—each of which adds a portion of the capability, and overall which creates an elastic function with higher availability than its former monolithic version. These virtual network elements 330, 332, 334, etc., may be instantiated and managed using an orchestration approach similar to those used in cloud compute services.

The cloud computing environments 375 may interface with the virtualized network function cloud 325 via APIs that expose functional capabilities of the VNEs 330, 332, 334, etc., to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
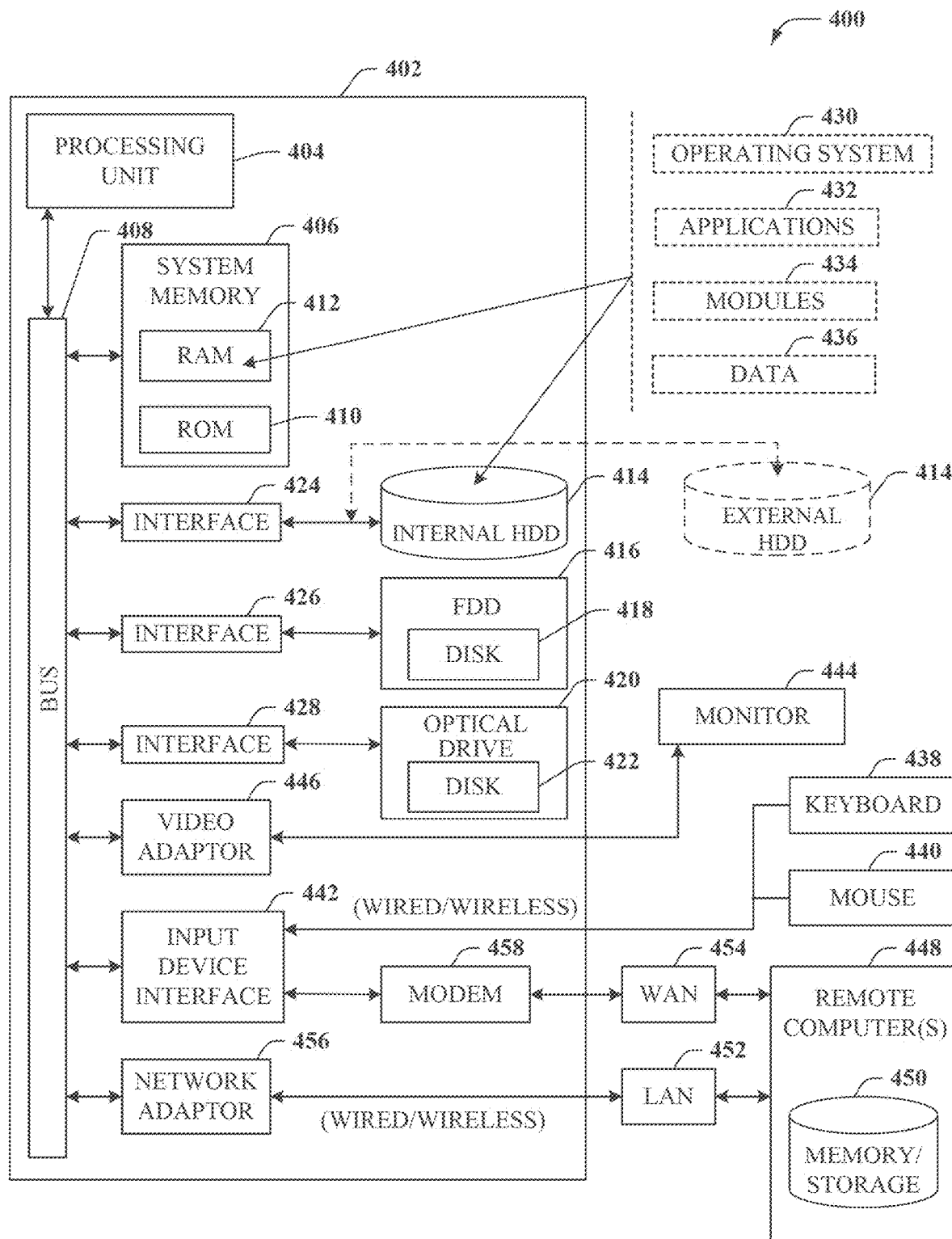
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure may be implemented. In particular, computing environment 400 may be used in the implementation of network elements 150, 152, 154, 156, access terminal 112, base station or access point 122, switching device 132, media terminal 142, and/or VNEs 330, 332, 334, etc. Each of these devices may be implemented via computer-executable instructions that may run on one or more computers, and/or in combination with other program modules and/or as a combination of hardware and software. For example, the computing environment 400 may facilitate in whole or in part improving a user's experience by utilizing machine learning to detect and adjust unsuitable scenes for a user when viewing media content. For example, an unsuitable segment of a program may be detected from metadata of the program that has been generated responsive to an application of a neural network trained to identify unsuitable content. Adjustment of the program segment may take one or more of a variety of forms adapted to overcome the unsuitability, while preserving continuity of the program, e.g., replacing the unsuitable segment or scene with an overlay and/or a replacement segment in which an avatar provides suitable dialogue and/or action to replace the unsuitable scene. Further, video content management servers, databases, media processors, mobile devices, and displays described herein include computing environment 400.

Generally, program modules include routines, programs, components, data structures, etc., that perform particular tasks or implement particular abstract data types. Moreover, those skilled in the art will appreciate that the processes may be practiced with other computer system configurations, comprising single-processor or multiprocessor computer systems, minicomputers, mainframe computers, as well as personal computers, hand-held computing devices, microprocessor-based or programmable consumer electronics, and the like, each of which may be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein may be also practiced in distributed computing environments where certain tasks are performed by remote processing devices that are linked through a communications network. In a distributed computing environment, program modules may be located in both local and remote memory storage devices.

Computing devices typically include a variety of media, which may include computer-readable storage media and/or communications media, which two terms are used herein differently from one another as follows. Computer-readable storage media may be any available storage media that may be accessed by the computer and includes both volatile and nonvolatile media, removable and non-removable media. By way of example, and not limitation, computer-readable storage media may be implemented in connection with any process or technology for storage of information such as computer-readable instructions, program modules, structured data, or unstructured data.

Computer-readable storage media may include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which may be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media may be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 4, the example environment may include a computer 402, the computer 402 comprising a processing unit 404, a system memory 406 and a system bus 408. The system bus 408 couples system components including, but not limited to, the system memory 406 to the processing unit 404. The processing unit 404 may be any of various commercially available processors. Dual microprocessors and other multiprocessor architectures may also be employed as the processing unit 404.

The system bus 408 may be any of several types of bus structure that may further interconnect to a memory bus (with or without a memory controller), a peripheral bus, and a local bus using any of a variety of commercially available bus architectures. The system memory 406 includes ROM 410 and RAM 412. A basic input/output system (BIOS) may be stored in a non-volatile memory such as ROM, erasable programmable read only memory (EPROM), EEPROM, which BIOS contains the basic routines that help to transfer information between elements within the computer 402, such as during startup. The RAM 412 may also include a high-speed RAM such as static RAM for caching data.

The computer 402 further includes an internal hard disk drive (HDD) 414 (e.g., EIDE, SATA), which internal HDD 414 may also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 may be connected to the system bus 408 by a hard disk drive interface 424, a magnetic disk drive interface 426 and an optical drive interface 428, respectively. The hard disk drive interface 424 for external drive implementations includes at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, may also be used in the example operating environment, and further, that any such storage media may contain computer-executable instructions for performing the processes described herein.

A number of program modules may be stored in the drives and RAM 412, comprising an operating system 430, one or more application programs 432, other program modules 434 and program data 436. All or portions of the operating system, applications, modules, and/or data may also be cached in the RAM 412. The systems and processes described herein may be implemented utilizing various commercially available operating systems or combinations of operating systems.

A user may enter commands and information into the computer 402 through one or more wired/wireless input devices, e.g., a keyboard 438 and a pointing device, such as a mouse 440. Other input devices (not shown) may include a microphone, an infrared (IR) remote control, a joystick, a game pad, a stylus pen, touch screen or the like. These and other input devices are often connected to the processing unit 404 through an input device interface 442 that may be coupled to the system bus 408, but may be connected by other interfaces, such as a parallel port, an IEEE 1394 serial port, a game port, a universal serial bus (USB) port, an IR interface, etc.

A monitor 444 or other type of display device may be also connected to the system bus 408 via an interface, such as a video adapter 446. It will also be appreciated that in alternative embodiments, a monitor 444 may also be any display device (e.g., another computer having a display, a smart phone, a tablet computer, etc.) for receiving display information associated with computer 402 via any communication means, including via the Internet and cloud-based networks. In addition to the monitor 444, a computer typically includes other peripheral output devices (not shown), such as speakers, printers, etc.

The computer 402 may operate in a networked environment using logical connections via wired and/or wireless communications to one or more remote computers, such as a remote computer(s) 448. The remote computer(s) 448 may be a workstation, a server computer, a router, a personal computer, portable computer, microprocessor-based entertainment appliance, a peer device or other common network node, and typically includes many or all of the elements described relative to the computer 402, although, for purposes of brevity, only a remote memory/storage device 450 is illustrated. The logical connections depicted include wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which may connect to a global communications network, e.g., the Internet.

When used in a LAN networking environment, the computer 402 may be connected to the LAN 452 through a wired and/or wireless communication network interface or adapter 456. The adapter 456 may facilitate wired or wireless communication to the LAN 452, which may also include a wireless AP disposed thereon for communicating with the adapter 456.

When used in a WAN networking environment, the computer 402 may include a modem 458 or may be connected to a communications server on the WAN 454 or has other means for establishing communications over the WAN 454, such as by way of the Internet. The modem 458, which may be internal or external and a wired or wireless device, may be connected to the system bus 408 via the input device interface 442. In a networked environment, program modules depicted relative to the computer 402 or portions thereof, may be stored in the remote memory/storage device 450. It will be appreciated that the network connections shown are example and other means of establishing a communications link between the computers may be used.

The computer 402 may be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This may include Wireless Fidelity (Wi-Fi) and BLUETOOTH® wireless technologies. Thus, the communication may be a predefined structure as with a conventional network or simply an ad hoc communication between at least two devices.

Wi-Fi may allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network may be used to connect computers to each other, to the Internet, and to wired networks (which may use IEEE 802.3 or Ethernet). Wi-Fi networks operate in the unlicensed 2.4 and 5 GHz radio bands for example or with products that contain both bands (dual band), so the networks may provide real-world performance similar to the basic 10BaseT or 100BaseT wired Ethernet networks used in many offices.

Figure 5:
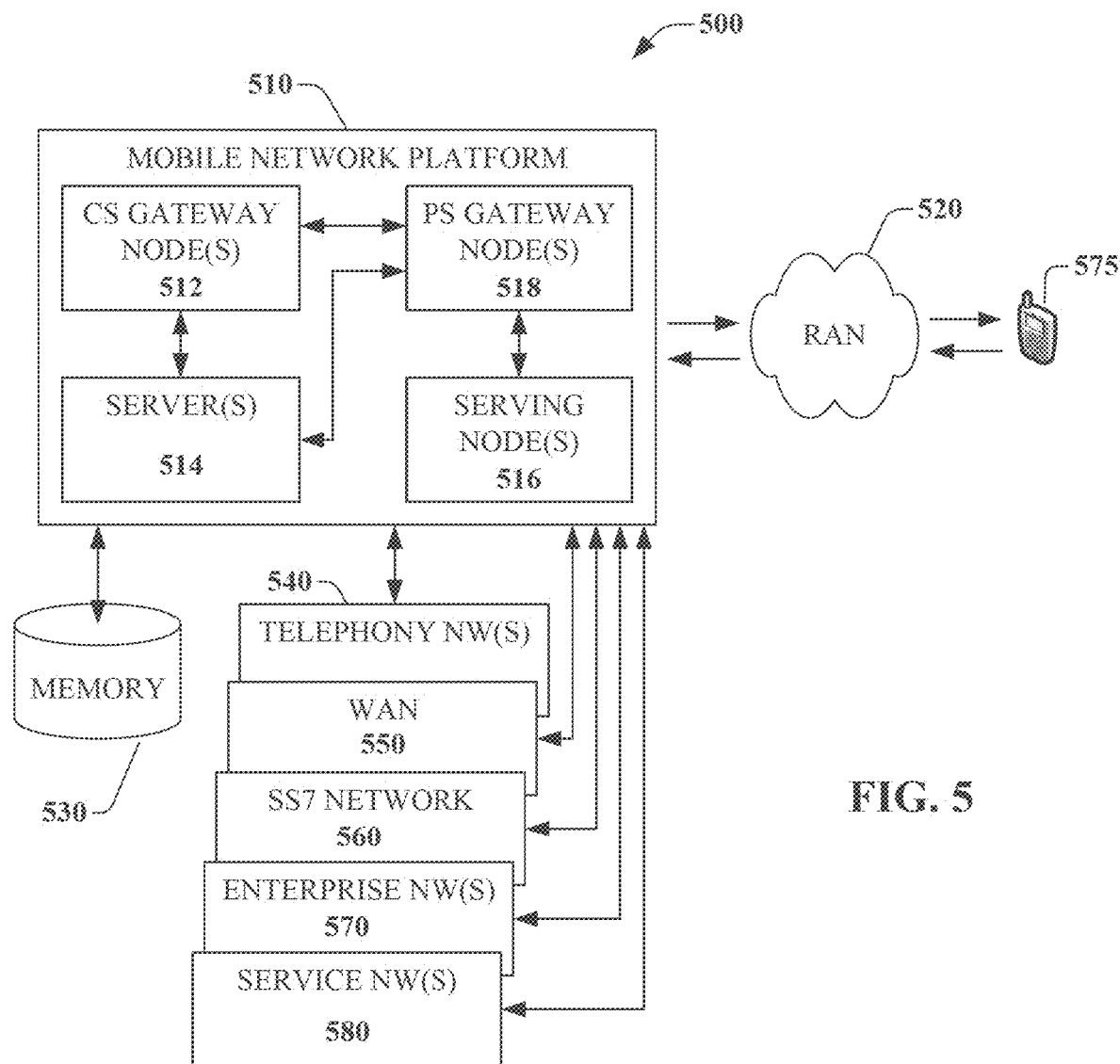
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, the platform 510 may facilitate in whole or in part improving a user's experience by utilizing machine learning to detect and adjust unsuitable scenes for a user when viewing media content. For example, an unsuitable segment of a program may be detected from metadata of the program that has been generated responsive to an application of a neural network trained to identify unsuitable content. Adjustment of the program segment may take one or more of a variety of forms adapted to overcome the unsuitability, while preserving continuity of the program, e.g., replacing the unsuitable segment or scene with an overlay and/or a replacement segment in which an avatar provides suitable dialogue and/or action to replace the unsuitable scene. In one or more embodiments, the mobile network platform 510 may generate and receive signals transmitted and received by base stations or access points such as base station or access point 122. Generally, mobile network platform 510 may include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 may be included in telecommunications carrier networks and may be considered carrier-side components as discussed elsewhere herein. Mobile network platform 510 includes CS gateway node(s) 512 which may interface CS traffic received from legacy networks like telephony network(s) 540 (e.g., public switched telephone network (PSTN), or public land mobile network (PLMN)) or a signaling system #7 (SS7) network 560. CS gateway node(s) 512 may authorize and authenticate traffic (e.g., voice) arising from such networks. Additionally, CS gateway node(s) 512 may access mobility, or roaming, data generated through SS7 network 560; for instance, mobility data stored in a visited location register (VLR), which may reside in memory 530. Moreover, CS gateway node(s) 512 interfaces CS-based traffic and signaling and PS gateway node(s) 518. As an example, in a 3GPP UMTS network, CS gateway node(s) 512 may be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 may authorize and authenticate PS-based data sessions with served mobile devices. Data sessions may include traffic, or content(s), exchanged with networks external to the mobile network platform 510, like wide area network(s) (WANs) 550, enterprise network(s) 570, and service network(s) 580, which may be embodied in local area network(s) (LANs), may also be interfaced with mobile network platform 510 through PS gateway node(s) 518. It is to be noted that WANs 550 and enterprise network(s) 570 may embody, at least in part, a service network(s) like IP multimedia subsystem (IMS). Based on radio technology layer(s) available in technology resource(s) or radio access network 520, PS gateway node(s) 518 may generate packet data protocol contexts when a data session is established; other data structures that facilitate routing of packetized data also may be generated. To that end, in an aspect, PS gateway node(s) 518 may include a tunnel interface (e.g., tunnel termination gateway (TTG) in 3GPP UMTS network(s) (not shown)) which may facilitate packetized communication with disparate wireless network(s), such as Wi-Fi networks.

In embodiment 500, mobile network platform 510 also includes serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) may deliver traffic without reliance on PS gateway node(s) 518; for example, server node(s) may embody at least in part a mobile switching center. As an example, in a 3GPP UMTS network, serving node(s) 516 may be embodied in serving GPRS support node(s) (SGSN).

For radio technologies that exploit packetized communication, server(s) 514 in mobile network platform 510 may execute numerous applications that may generate multiple disparate packetized data streams or flows, and manage (e.g., schedule, queue, format . . . ) such flows. Such application(s) may include add-on features to standard services (for example, provisioning, billing, customer support . . . ) provided by mobile network platform 510. Data streams (e.g., content(s) that are part of a voice call or data session) may be conveyed to PS gateway node(s) 518 for authorization/authentication and initiation of a data session, and to serving node(s) 516 for communication thereafter. In addition to application server, server(s) 514 may include utility server(s), a utility server may include a provisioning server, an operations and maintenance server, a security server that may implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 may enact. Moreover, provisioning server(s) may provision services from external network(s) like networks operated by a disparate service provider; for instance, WAN 550 or Global Positioning System (GPS) network(s) (not shown). Provisioning server(s) may also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 may include one or more processors configured to confer at least in part the functionality of mobile network platform 510. To that end, the one or more processors may execute code instructions stored in memory 530, for example. It should be appreciated that server(s) 514 may include a content manager, which operates in substantially the same manner as described hereinbefore.

In example embodiment 500, memory 530 may store information related to operation of mobile network platform 510. Other operational information may include provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 may also store information from at least one of telephony network(s) 540, WAN 550, SS7 network 560, or enterprise network(s) 570. In an aspect, memory 530 may be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the disclosed subject matter also may be implemented in combination with other program modules. Generally, program modules include routines, programs, components, data structures, etc., that perform particular tasks and/or implement particular abstract data types.

Figure 6:
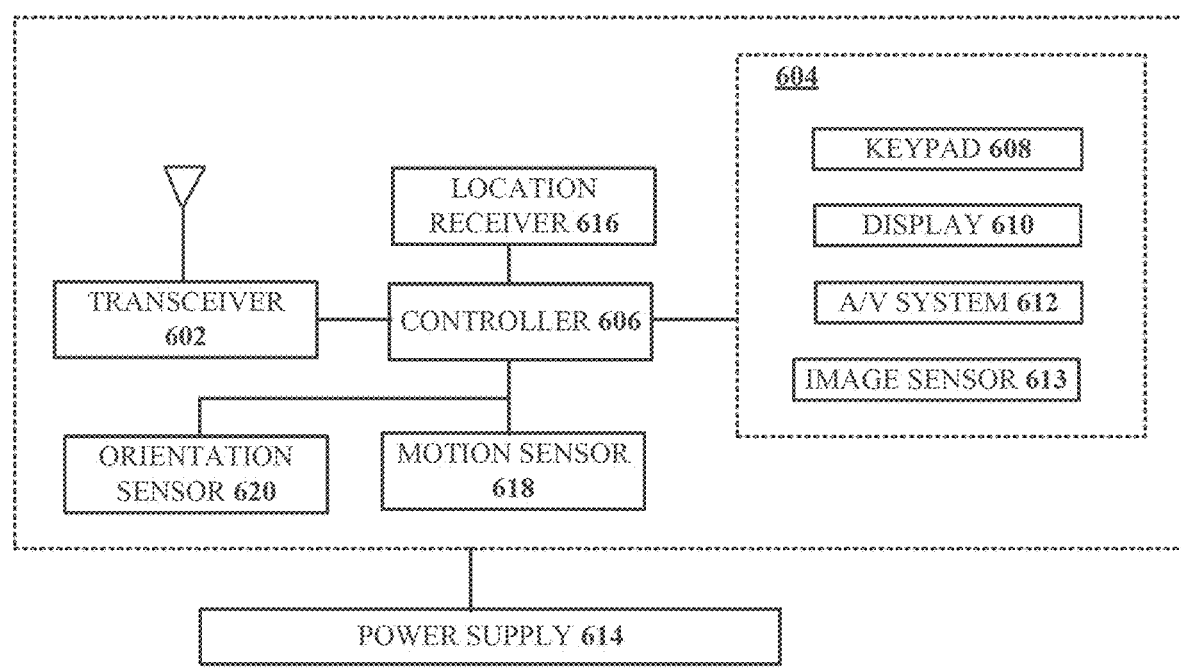
FIG. 6 is a block diagram of an example, non-limiting embodiment of a communication device in accordance with various aspects described herein.

Turning now to FIG. 6, an illustrative embodiment of a communication device 600 is shown. The communication device 600 may serve as an illustrative embodiment of devices such as data terminals 114, mobile devices 124, vehicle 126, display devices 144 or other client devices for communication via either communications network 125. For example, the communication device 600 may facilitate in whole or in part improving a user's experience by utilizing machine learning to detect and adjust unsuitable scenes for a user when viewing media content. For example, an unsuitable segment of a program may be detected from metadata of the program that has been generated responsive to an application of a neural network trained to identify unsuitable content. Adjustment of the program segment may take one or more of a variety of forms adapted to overcome the unsuitability, while preserving continuity of the program, e.g., replacing the unsuitable segment or scene with an overlay and/or a replacement segment in which an avatar provides suitable dialogue and/or action to replace the unsuitable scene. Further, video content management servers, databases, media processors, mobile devices, and displays described herein include communication device 600.

The communication device 600 may include a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 may support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies may include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 may also be adapted to support circuit-switched wireline access technologies (such as PSTN), packet-switched wireline access technologies (such as TCP/IP, VoIP, etc.), and combinations thereof.

The UI 604 may include a depressible or touch-sensitive keypad 608 with a navigation mechanism such as a roller ball, a joystick, a mouse, or a navigation disk for manipulating operations of the communication device 600. The keypad 608 may be an integral part of a housing assembly of the communication device 600 or an independent device operably coupled thereto by a tethered wireline interface (such as a USB cable) or a wireless interface supporting for example Bluetooth®. The keypad 608 may represent a numeric keypad commonly used by phones, and/or a QWERTY keypad with alphanumeric keys. The UI 604 may further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 may be presented by way of the display 610 with navigation features.

The display 610 may use touch screen technology to also serve as a user interface for detecting user input. As a touch screen display, the communication device 600 may be adapted to present a user interface having graphical user interface (GUI) elements that may be selected by a user with a touch of a finger. The display 610 may be equipped with capacitive, resistive, or other forms of sensing technology to detect how much surface area of a user's finger has been placed on a portion of the touch screen display. This sensing information may be used to control the manipulation of the GUI elements or other functions of the user interface. The display 610 may be an integral part of the housing assembly of the communication device 600 or an independent device communicatively coupled thereto by a tethered wireline interface (such as a cable) or a wireless interface.

The UI 604 may also include an audio system 612 that utilizes audio technology for conveying low volume audio (such as audio heard in proximity of a human ear) and high-volume audio (such as speakerphone for hands free operation). The audio system 612 may further include a microphone for receiving audible signals of an end user. The audio system 612 may also be used for voice recognition applications. The UI 604 may further include an image sensor 613 such as a charged coupled device (CCD) camera for capturing still or moving images.

The power supply 614 may utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system may utilize external power sources such as DC power supplied over a physical interface such as a USB port or other suitable tethering technologies.

The location receiver 616 may utilize location technology such as a global positioning system (GPS) receiver capable of assisted GPS for identifying a location of the communication device 600 based on signals generated by a constellation of GPS satellites, which may be used for facilitating location services such as navigation. The motion sensor 618 may utilize motion sensing technology such as an accelerometer, a gyroscope, or other suitable motion sensing technology to detect motion of the communication device 600 in three-dimensional space. The orientation sensor 620 may utilize orientation sensing technology such as a magnetometer to detect the orientation of the communication device 600 (north, south, west, and east, as well as combined orientations in degrees, minutes, or other suitable orientation metrics).

The communication device 600 may use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 may utilize computing technologies such as a microprocessor, a digital signal processor (DSP), programmable gate arrays, application specific integrated circuits, and/or a video processor with associated storage memory such as Flash, ROM, RAM, SRAM, DRAM, or other storage technologies for executing computer instructions, controlling, and processing data supplied by the aforementioned components of the communication device 600.

Other components not shown in FIG. 6 may be used in one or more embodiments of the subject disclosure. For instance, the communication device 600 may include a slot for adding or removing an identity module such as a Subscriber Identity Module (SIM) card or Universal Integrated Circuit Card (UICC). SIM or UICC cards may be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein may be either volatile memory or nonvolatile memory, or may include both volatile and nonvolatile memory, by way of illustration, and not limitation, volatile memory, non-volatile memory, disk storage, and memory storage. Further, nonvolatile memory may be included in read only memory (ROM), programmable ROM (PROM), electrically programmable ROM (EPROM), electrically erasable ROM (EEPROM), or flash memory. Volatile memory may include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or processes herein are intended to include, without being limited to comprising, these and any other suitable types of memory.

Moreover, it will be noted that the disclosed subject matter may be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects may also be practiced in distributed computing environments where tasks are performed by remote processing devices that are linked through a communications network; however, some if not all aspects of the subject disclosure may be practiced on stand-alone computers. In a distributed computing environment, program modules may be located in both local and remote memory storage devices.

In one or more embodiments, information regarding use of services may be generated including services being accessed, media consumption history, user preferences, and so forth. This information may be obtained by various processes including user input, detecting types of communications (e.g., video content vs. audio content), analysis of content streams, sampling, and so forth. The generating, obtaining and/or monitoring of this information may be responsive to an authorization provided by the user. In one or more embodiments, an analysis of data may be subject to authorization from user(s) associated with the data, such as an opt-in, an opt-out, acknowledgement requirements, notifications, selective authorization based on types of data, and so forth.

Some of the embodiments described herein may also employ artificial intelligence (AI) to facilitate automating one or more features described herein. The embodiments (e.g., in connection with automatically identifying acquired cell sites that provide a maximum value/benefit after addition to an existing communication network) may employ various AI-based schemes for carrying out various embodiments thereof. Moreover, the classifier may be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$ =confidence (class). Such classification may employ a probabilistic and/or statistical-based analysis (e.g., factoring into the analysis utilities and costs) to determine or infer an action that a user desires to be automatically performed. A support vector machine (SVM) is an example of a classifier that may be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence may be employed. Classification as used herein also is inclusive of statistical regression that is utilized to develop models of priority.

As will be readily appreciated, one or more of the embodiments may employ classifiers that are explicitly trained (e.g., via a generic training data) as well as implicitly trained (e.g., via observing UE behavior, operator preferences, historical information, receiving extrinsic information). For example, SVMs may be configured via a learning or training phase within a classifier constructor and feature selection module. Thus, the classifier(s) may be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or include a computer-related entity or an entity related to an operational apparatus with one or more specific functionalities, wherein the entity may be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server may be a component. One or more components may reside within a process and/or thread of execution and a component may be localized on one computer and/or distributed between two or more computers. In addition, these components may execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component may be an apparatus with specific functionality provided by mechanical parts operated by electric or electronic circuitry, which is operated by a software or firmware application executed by a processor, wherein the processor may be internal or external to the apparatus and executes at least a part of the software or firmware application. As yet another example, a component may be an apparatus that provides specific functionality through electronic components without mechanical parts, the electronic components may include a processor therein to execute software or firmware that confers at least in part the functionality of the electronic components. While various components have been illustrated as separate components, it will be appreciated that multiple components may be implemented as a single component, or a single component may be implemented as multiple components, without departing from example embodiments.

Further, the various embodiments may be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device or computer-readable storage/communications media. For example, computer readable storage media may include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications may be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) may refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms may refer to human entities or automated components supported through artificial intelligence (e.g., a capacity to make inference based, at least, on complex mathematical formalisms), which may provide simulated vision, sound recognition and so forth.

As employed herein, the term "processor" may refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor may refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors may exploit nano-scale architectures such as, but not limited to, molecular and quantum-dot based transistors, switches, and gates, in order to optimize space usage or enhance performance of user equipment. A processor may also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein may be either volatile memory or nonvolatile memory or may include both volatile and nonvolatile memory.

What has been described above includes mere examples of various embodiments. It is, of course, not possible to describe every conceivable combination of components or methodologies for purposes of describing these examples, but one of ordinary skill in the art may recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented may optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature, or format of information in a signal, while one or more elements of the information in the signal are nevertheless conveyed in a manner than may be recognized by the second item. In a further example of indirect coupling, an action in a first item may cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, may be used in the subject disclosure. For instance, one or more features from one or more embodiments may be combined with one or more features of one or more other embodiments. In one or more embodiments, features that are positively recited may also be negatively recited and excluded from the embodiment with or without replacement by another structural and/or functional feature. The steps or functions described with respect to the embodiments of the subject disclosure may be performed in any order. The steps or functions described with respect to the embodiments of the subject disclosure may be performed alone or in combination with other steps or functions of the subject disclosure, as well as from other embodiments or from other steps that have not been described in the subject disclosure. Further, more than or less than all of the features described with respect to an embodiment may also be utilized.

What is claimed is:

1. A device, comprising:
a processing system including a processor; and
a memory that stores executable instructions that, when executed by the processing system, facilitate performance of operations, the operations comprising:
obtaining original media content comprising plurality of scenes;
providing the plurality of scenes as input to a neural network adapted to categorize the plurality of scenes according to a plurality of predetermined categories to obtain a scene-by-scene categorization;
generating metadata according to the scene-by-scene categorization, wherein the metadata comprises a characterization of each scene of the plurality of scenes of the original media content according to the plurality of predetermined categories;
receiving a preference of a user that identifies an objectionable category of the plurality of predetermined categories;
identifying an objectionable activity according to the preference of the user;
identifying a first objectionable scene of the plurality of scenes portraying an individual engaged in the objectionable activity and a non-objectionable activity according to a first characterization of the first objectionable scene of the plurality of scenes;
generating, responsive to the identifying the first objectionable scene, a first altered scene, wherein the first altered scene is based on a first content of the first objectionable scene and provides a first suitable scene in place of the first objectionable scene, wherein the first suitable scene comprises an avatar performing, in place of the individual, the non-objectionable activity, without performing the objectionable activity to preserve information of the first content of the first objectionable scene to obtain preserved information; and
replacing first objectionable scene with the first altered scene to obtain adapted media content, wherein presentation of the adapted media content via equipment of the user avoids presentation of the first objectionable scene, while maintaining a continuity of the original media content via the preserved information.

2. The device of claim 1, wherein the receiving of the preference of the user further comprises receiving a user selection of the objectionable category obtained responsive to a presentation of the plurality of predetermined categories via the equipment of the user.

3. The device of claim 1, wherein the receiving of the preference of the user further comprises determining the objectionable category from a user profile.

4. The device of claim 1, wherein the generating of the first altered scene comprises generating the avatar for presentation within the first altered scene.

5. The device of claim 4, wherein the avatar is generated in real time and provides an apt presentation of the information of the first content of the first objectionable scene.

6. The device of claim 5, wherein the non-objectionable activity comprises one of dialogue, or action or both.

7. The device of claim 1, wherein the replacing of the first objectionable scene with the first altered scene is accomplished before a forwarding of the adapted media content to the equipment of the user.

8. The device of claim 1, wherein the replacing of the first objectionable scene with the first altered scene comprises insertion of an advertisement.

9. The device of claim 8, wherein the advertisement comprises one of an overlay, a banner, a caption, a product placement, or any combination thereof.

10. The device of claim 1, further comprising:
receiving user feedback responsive to the presentation of the adapted media content; and
retraining the neural network according to the user feedback to obtain a retrained neural network.

11. A method, comprising:
obtaining, by a processing system including a processor, original media content comprising a plurality of scenes;
providing, by the processing system, the plurality of scenes as input to a neural network adapted to categorize the plurality of scenes according to a plurality of predetermined categories to obtain a scene-by-scene categorization;
generating, by the processing system, metadata according to the scene-by-scene categorization, wherein the metadata comprises a characterization of each scene of the plurality of scenes of the original media content according to the plurality of predetermined categories;
identifying, by the processing system, a preference of a user that identifies an objectionable category of the plurality of predetermined categories;
identifying, by the processing system, an objectionable activity according to the preference of the user;
identifying, by the processing system, a first objectionable scene of the plurality of scenes portraying an individual engaged in the objectionable activity and a non-objectionable activity according to a first characterization of the first objectionable scene of the plurality of scenes;
obtaining, by the processing system and responsive to the identifying the first objectionable scene, a first altered scene, wherein the first altered scene is based on a first content of the first objectionable scene and provides a first suitable scene in place of the first objectionable scene, wherein the first suitable scene comprises an avatar performing, in place of the individual, the non-objectionable activity, without performing the objectionable activity to preserve information of the first content of the first objectionable scene to obtain preserved information; and
replacing, by the processing system, the first objectionable scene with the first altered scene to obtain adapted media content, wherein presentation of the adapted media content via equipment of the user avoids presentation of the first objectionable scene, while maintaining a continuity of the original media content via the preserved information.

12. The method of claim 11, wherein the obtaining of the first altered scene comprises generating the avatar for presentation within the first altered scene.

13. The method of claim 12, wherein the avatar provides a suitable presentation of the information of the first content.

14. The method of claim 11, wherein the replacing of the first objectionable scene with the first altered scene is accomplished before a forwarding of the adapted media content to the equipment of the user.

15. The method of claim 11, wherein the identifying the preference of the user further comprises identifying a user selection of the objectionable category obtained responsive to a presentation of the plurality of predetermined categories via the equipment of the user.

16. A non-transitory, machine-readable medium, comprising executable instructions that, when executed by a processing system including a processor, facilitate performance of operations, the operations comprising:
obtaining original media content comprising a plurality of scenes;
providing the plurality of scenes as input to a neural network adapted to categorize the plurality of scenes according to a plurality of predetermined categories to obtain a scene-by-scene categorization;
generating metadata according to the scene-by-scene categorization, wherein the metadata comprises a characterization of each scene of the plurality of scenes of the original media content according to the plurality of predetermined categories;
identifying a user preference that identifies an objectionable category of the plurality of predetermined categories;
identifying an objectionable activity according to the user preference;
identifying a first objectionable scene of the plurality of scenes portraying an individual engaged in the objectionable activity and a non-objectionable activity according to a first characterization of the first objectionable scene of the plurality of scenes;
obtaining, responsive to the identifying the first objectionable scene, a first altered scene, wherein the first altered scene is based on a first content of the first objectionable scene and provides a first suitable scene in place of the first objectionable scene, wherein the first suitable scene comprises an avatar performing, in place of the individual, the non-objectionable activity, without performing the objectionable activity to preserve information of the first content of the first objectionable scene to obtain preserved information; and
facilitating replacement of the first objectionable scene with the first altered scene to obtain adapted media content, wherein presentation of the adapted media content via user equipment avoids presentation of the first objectionable scene, while maintaining a continuity of the original media content via the preserved information.

17. The non-transitory, machine-readable medium of claim 16, wherein the obtaining of the first altered scene comprises obtaining the avatar for presentation within the first altered scene.

18. The non-transitory, machine-readable medium of claim 17, wherein the avatar provides a suitable presentation of the information of the first content.

19. The non-transitory, machine-readable medium of claim 18, wherein the replacement of the first objectionable scene with the first altered scene is accomplished before a forwarding of the adapted media content to the user equipment.

20. The non-transitory, machine-readable medium of claim 16, wherein the identifying the user preference further comprises identifying a user selection of the objectionable category obtained responsive to a presentation of the plurality of predetermined categories via user equipment.

* * * * *